United States Patent
Lundy et al.

(10) Patent No.: US 11,273,799 B2
(45) Date of Patent: Mar. 15, 2022

(54) MANUALLY-OPERATED TRAILER WASH APPARATUS

(71) Applicant: WashPro Systems, LLC, Colgate, WI (US)

(72) Inventors: Jerry Lundy, Plymouth, WI (US); Mark E. Jensen, Colgate, WI (US)

(73) Assignee: WashPro Systems, LLC, Colgate, WI (US)

( * ) Notice: Subject to any disclaimer, the term of this patent is extended or adjusted under 35 U.S.C. 154(b) by 135 days.

(21) Appl. No.: 16/437,107

(22) Filed: Jun. 11, 2019

(65) Prior Publication Data

US 2019/0375379 A1   Dec. 12, 2019

Related U.S. Application Data

(60) Provisional application No. 62/683,894, filed on Jun. 12, 2018.

(51) Int. Cl.
| | | |
|---|---|---|
| *B60S 3/00* | (2006.01) | |
| *B60P 3/30* | (2006.01) | |
| *B08B 9/093* | (2006.01) | |
| *B05B 1/20* | (2006.01) | |
| *B60R 3/00* | (2006.01) | |

(52) U.S. Cl.
CPC ............ *B60S 3/008* (2013.01); *B05B 1/20* (2013.01); *B08B 9/093* (2013.01); *B60P 3/30* (2013.01); *B60R 3/007* (2013.01)

(58) Field of Classification Search
CPC .................................. B60S 3/008; B05B 1/20
See application file for complete search history.

(56) References Cited

U.S. PATENT DOCUMENTS

| | | | |
|---|---|---|---|
| 2,581,678 A | 1/1952 | Malin et al. | |
| 2,638,730 A | 5/1953 | Davidson | |
| 3,534,746 A | 10/1968 | Posner | |
| 3,701,356 A * | 10/1972 | Hanna ...................... | B60S 3/04 |
| | | | 134/58 R |

(Continued)

FOREIGN PATENT DOCUMENTS

WO   WO-2011141354 A1 * 11/2011   ........... B08B 9/0936

OTHER PUBLICATIONS

Merriam-Webster, (n.d.). Manual. In Merriam-Webster.com dictionary. Retrieved Nov. 3, 2020, from https://www.merriam-webster.com/dictionary/manual (Year: 2020).*

(Continued)

*Primary Examiner* — Michael E Barr
*Assistant Examiner* — Omair Chaudhri
(74) *Attorney, Agent, or Firm* — Becker Patent Law, LLC

(57) ABSTRACT

A manually-operated trailer wash apparatus for washing an interior of a trailer includes a frame with a handle configured to be manually pushed by a human operator and front and rear wheels. Rotatable couplings are disposed between each of the wheels and the frame to rotate the wheels in response to the manual pushing of the handle. A conduit is coupled to the frame and extends transversely across a direction of travel of the apparatus. The conduit has a plurality of nozzles to pressure wash a surface on which the apparatus travels. The conduit receives pressurized fluid from a hose and pump system.

21 Claims, 22 Drawing Sheets

(56) References Cited

U.S. PATENT DOCUMENTS

| | | | | |
|---|---|---|---|---|
| 3,913,837 A * | 10/1975 | Grant | | B08B 3/024 239/198 |
| 3,931,931 A * | 1/1976 | Otis | | B05B 1/202 239/754 |
| 3,973,988 A * | 8/1976 | McMahan | | B60S 3/008 134/46 |
| 4,106,516 A | 8/1978 | Wiegand | | |
| 4,141,374 A * | 2/1979 | McMahan | | B60S 3/008 134/104.4 |
| 4,174,021 A * | 11/1979 | Barlock | | B62B 5/00 182/127 |
| 4,240,175 A * | 12/1980 | Rogers | | B08B 9/08 134/45 |
| 4,309,788 A * | 1/1982 | Brager | | B60S 3/008 15/53.2 |
| 4,340,176 A * | 7/1982 | Bernard | | B08B 3/024 239/102.1 |
| 4,784,166 A * | 11/1988 | Brager | | B60S 3/008 134/103.1 |
| 5,456,412 A * | 10/1995 | Agee | | B08B 3/024 239/104 |
| 6,267,308 B1 * | 7/2001 | Hall | | B08B 3/024 134/172 |
| 6,571,805 B2 * | 6/2003 | Hoenisch | | B08B 3/026 134/103.2 |
| 7,896,266 B1 * | 3/2011 | Cooper | | B05B 12/34 239/754 |
| 2005/0205120 A1 * | 9/2005 | Faulhaber | | A47L 11/03 134/172 |
| 2006/0124154 A1 * | 6/2006 | Rivalto | | B08B 3/024 134/18 |
| 2007/0186956 A1 * | 8/2007 | Schlueter | | B60S 3/044 134/8 |
| 2007/0221251 A1 * | 9/2007 | Gregory | | B08B 9/0936 134/22.18 |
| 2008/0000501 A1 * | 1/2008 | Sprecher | | B08B 3/024 134/42 |
| 2008/0023573 A1 * | 1/2008 | Ossian | | E01H 5/04 239/168 |
| 2008/0210775 A1 * | 9/2008 | Boekelman | | B05B 1/30 239/124 |
| 2010/0294855 A1 * | 11/2010 | Johnson | | F04B 17/06 239/289 |
| 2011/0030724 A1 * | 2/2011 | Alexander | | B08B 3/026 134/6 |
| 2012/0074665 A1 * | 3/2012 | Salvucci, Jr. | | B62B 3/104 280/47.24 |
| 2014/0334910 A1 * | 11/2014 | Raasch | | B62B 5/049 414/800 |
| 2015/0102121 A1 * | 4/2015 | Dey | | B08B 3/08 239/1 |
| 2015/0224547 A1 * | 8/2015 | Butler | | B08B 3/024 239/754 |
| 2016/0296979 A1 * | 10/2016 | Boyd | | A47L 11/4072 |
| 2017/0314327 A1 * | 11/2017 | Green | | E06C 1/387 |
| 2018/0194292 A1 * | 7/2018 | Finstad | | E06C 1/397 |
| 2019/0023234 A1 * | 1/2019 | Young | | B60S 3/008 |
| 2019/0322246 A1 * | 10/2019 | Sarne | | B60P 3/1033 |

OTHER PUBLICATIONS

JDControls, Four Way Ball Valves, 2018, https://web.archive.org/web/20180311140801/http://www.jdvalves.com/four_way_ball_valves.htm (Year: 2018).*

Our National Washout Procedure for Box & Reefer Trailers/Trucks, printed from Internet https://bluebeacon.com/wp-content/uploads/2018/08/WashoutProcedure.pdf on Jun. 3, 2019, 1 page.

Trailer Washouts, printed from Internet https://bluebeacon.com/our-services/washouts/ on June 3, 20198, 2 pages.

Patriot Interior Trailer Wash, printed from Internet https://americantruckwash.com/wash-systems/patriot/ on Jun. 3, 2019, 3 pages.

Patriot—Fleet Wash Systems & Automated Trailer Washouts, printed from Internet https://americantruckwash.com on Jun. 3, 2019, 3 pages.

Washout Solutions, printed from Internet www.vawashout.com/#solution.html on Jun. 3, 2019, 1 page.

Powerline USA, Power Wash Trailers & Pressure Washing Equipment, printed from Internet https://powerlineindustries.com on Jun. 3, 2019, 9 pages.

* cited by examiner

MANUALLY-OPERATED TRAILER WASH APPARATUS

CROSS-REFERENCE TO RELATED APPLICATIONS

This application claims the benefit of U.S. Provisional Application No. 62/683,894, filed Jun. 12, 2018, which is incorporated by reference herein in its entirety.

BACKGROUND

Refrigerated trailers often carry food products in a temperature-controlled environment. To avoid cross-contamination of loads, trailers are to be periodically or regularly cleaned and/or sanitized based on certain shipper protocols.

The U.S Food and Drug Administration implements the Food Safety Modernization Act (FSMA) which is directed to regular cleaning of trailers. The FSMA was designed to improve food safety and address concerns with foodborne illnesses. The FDA is charged with enforcing provisions relating to regular washing of trailers.

Some current trailer washing devices are fully automated devices that enter and exit a trailer while pressure washing portions of the interior of the trailer. These systems are expensive and require complicated installation procedures. Other solutions involved one or two human operators with hand-held pressure spray hoses moving about the trailer. However, this approach is labor intensive and can lead to inconsistent washing.

DETAILED DESCRIPTION OF ILLUSTRATIVE EMBODIMENTS

In some embodiments, trailer wash systems and methods are provided that are less expensive than automated systems.

In some embodiments, trailer wash systems and methods are provided that are less complicated and do not require expensive installations.

In some embodiments, trailer wash systems and methods are provided that include a solution for removing pallet pieces and other large debris that may be wedged in rails of a trailer floor.

In some embodiments, trailer wash systems and methods are provided that are more portable that fully automated systems.

In some embodiments, trailer wash systems and methods are provided that are less labor intensive than the use of hand sprayers alone.

In some embodiments, trailer wash systems and methods provide a high pressure wash at a higher gallon per minute flow than hand sprayers alone.

In some embodiments, trailer wash systems and methods are provided that alleviate operator fatigue and inconsistent washing associated with the use of hand sprayers alone.

In some embodiments, a combination of a close proximity of nozzles to the floor, high pressure fluid, and a high flow rate cleans floors exceptionally well.

In some embodiments, a trailer may be washed in a single pass, or in multiple passes.

Figure 1:
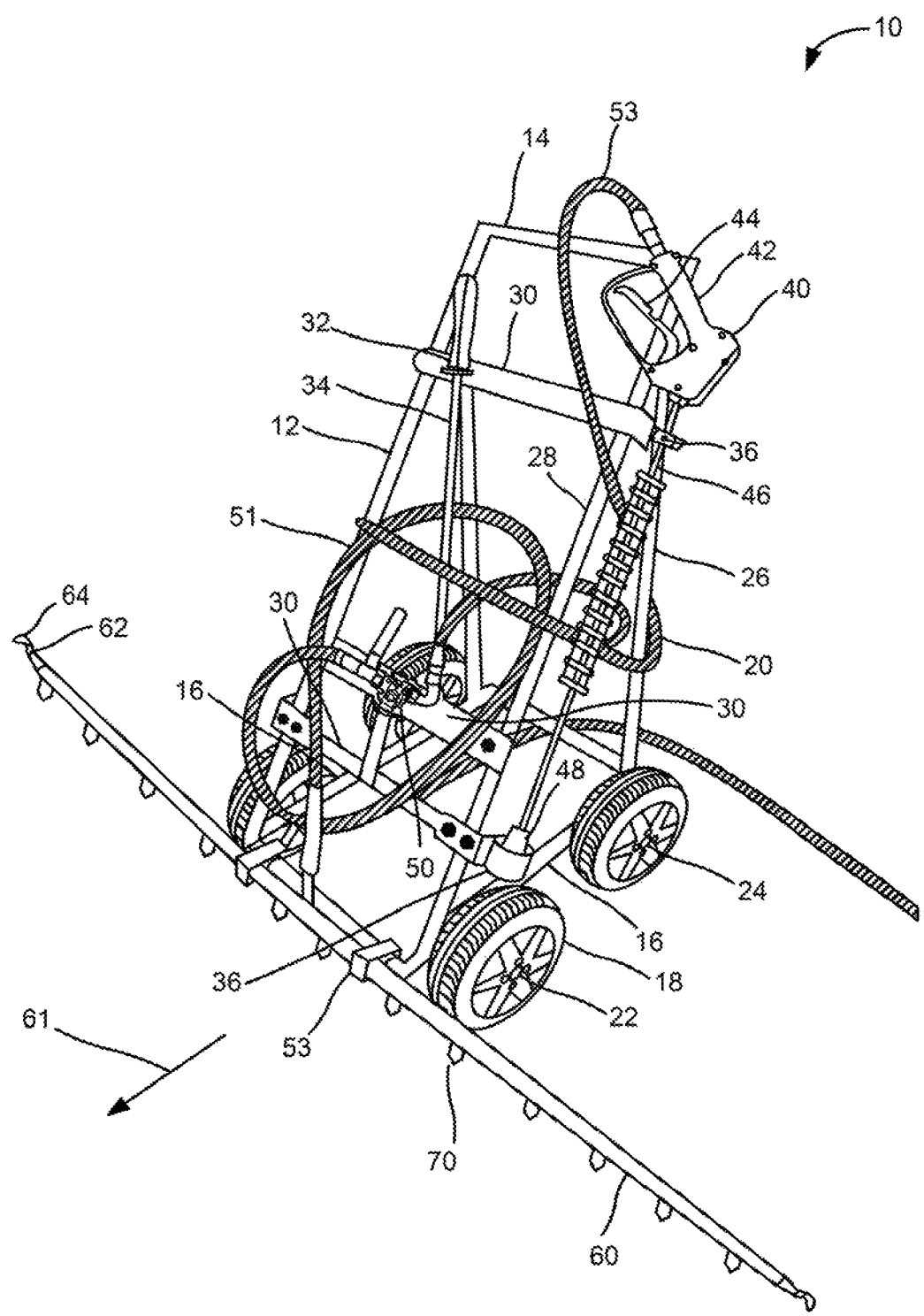
FIG. 1 is a perspective view of a trailer wash apparatus, according to an illustrative embodiment.

Referring now to FIG. 1, a manually-operated trailer wash apparatus 10 will be described, according to an illustrative embodiment. Apparatus 10 may be a cart or other apparatus having a frame 12 comprising or defining a handle 14 configured to be manually pushed by a human operator. Handle 14 may be disposed between about 36 inches and about 56 inches from a surface on which apparatus 10 rides (or from the bottom of a front or rear wheel, as will be described). In another embodiment, handle 14 may be disposed between about 48 inches and about 54 inches from the surface. The human operator stands or walks behind frame 12 and grips handle 14 to maneuver apparatus 10 into, around in, and out of a trailer of a semi-trailer truck. Frame 12 may be made from a lightweight aluminum, which may be non-corrosive. Alternatively, the frame may be made from other metals such as stainless steel, or from non-metals such as plastics, such as polyvinyl chloride. The frame may be of one-piece or multiple piece construction, assembled or molded, etc., and may comprise an A-frame, U-frame, H-frame or other shape or configuration.

Apparatus 12 may comprise at least one front wheel and is shown with two front wheels 18 disposed approximately coaxial on elongate base couplings 16 which may comprise axles, pins, or other couplings. At least one rear wheel, and preferably two rear wheels 20 may also be disposed on elongate base couplings 16. Rotatable couplings 22, 24 are disposed between each of the wheels 18, 24 and the frame, the rotatable couplings configured to freely rotate the wheels in response to the manual pushing of the handle. The couplings may comprise casters, axels, bearings, or other couplings to allow smooth, free movement of the wheels when frame 12 is pushed or pulled at handle 14. According to one aspect, wheels 18, 24 are not motor-driven or automatically driven, but rather are moved in response to forces exerted on frame 12. The rotatable couplings may be configured to rotate the wheels in response to the manual pushing of handle 14. Wheels may be at least about 8 inches in diameter, at least about 10 inches in diameter, or at least about 16 inches in diameter in various embodiments. Wheels may be flat free tires, polyurethane tires, or have other tire characteristics, such as treads, etc. In one advantageous embodiment, at least four wheels (two front and two rear) are implemented to allow the frame to be pushed in a straight direction, to avoid collusion with sidewalls of the trailer. In some embodiments, the wheels are sufficiently large to allow the apparatus to roll over any of the hoses used with apparatus. In some embodiments, the wheels rotate on a plane which is fixed and/or non-adjustable (i.e., are not swivel-type wheels) to provide better movement in a linear direction.

Figure 17:
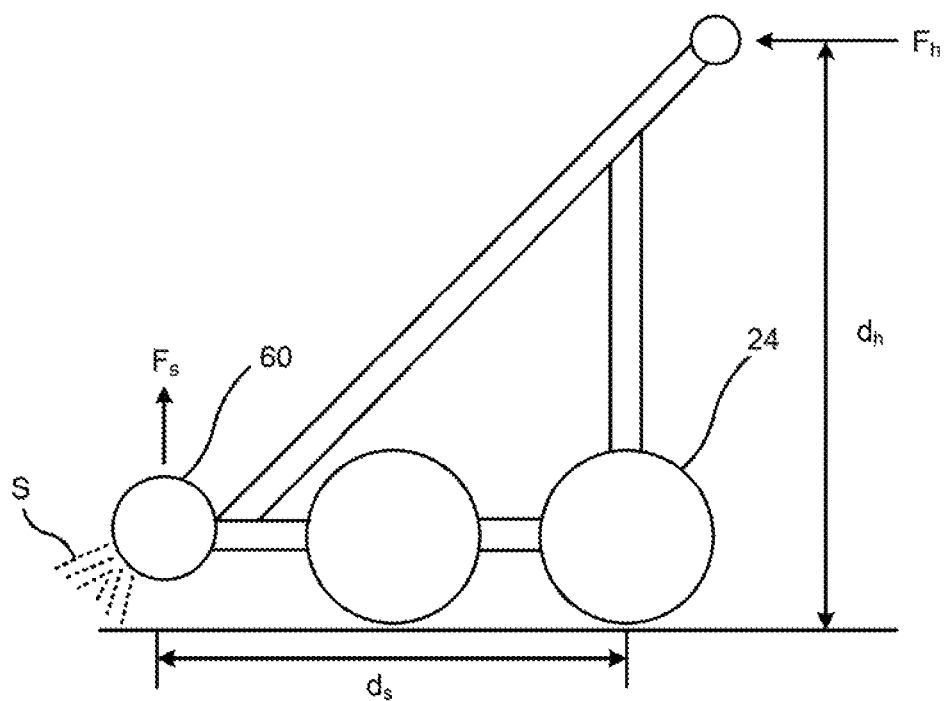
FIG. 17 is a drawing illustrating forces impinging on a trailer wash apparatus, according to an illustrative embodiment.

Referring to FIG. 17, a force diagram illustrates forces present on apparatus 12 during operation. In some embodiments, a distance between rear wheels 24 and spray conduit 60, $d_s$, is made short in relationship to a handle height do from the floor over which apparatus 12 rides. In various embodiments, $d_s$ may be less than about one half $d_h$, less than about one third $d_h$, or other ratios. When activated, the spray S from the nozzles can cause a force that could tip the cart backwards. Pushing on the handle with force $F_h$ keeps the wheels on the floor and the nozzles close to the floor. In some embodiments, apparatus 12 has a distance do sufficiently high relative to distance $d_s$ such that apparatus 12 avoids tipping backward when $F_h$ is less than a predetermined force. If there is enough counterweight on the front of apparatus 12, then Fh can be zero.

Frame 12 may comprise an A-shape when viewed from a side, comprising a substantially vertical linkage 26, an angled linkage 28, and base linkage 16. When viewed from a side, linkages 16, 26 and 28 may form an A shape, a triangular shape, a substantially right triangle, a substantially equilateral triangle, an isosceles triangle, or other shapes. Linkages 16 and 26 may form an L-shape. According to one advantageous aspect, the use of an A-shaped linkage assembly simplifies tilting and other maneuvering of apparatus 10, for example within a trailer. 12. In some embodiments, the apparatus may comprise at least two front wheels and at least two rear wheels, the frame forming an A-shape when viewed from a side with one set of descending members coupled near the rear wheels and a second set of descending members coupled near the front wheels.

Figure 15:
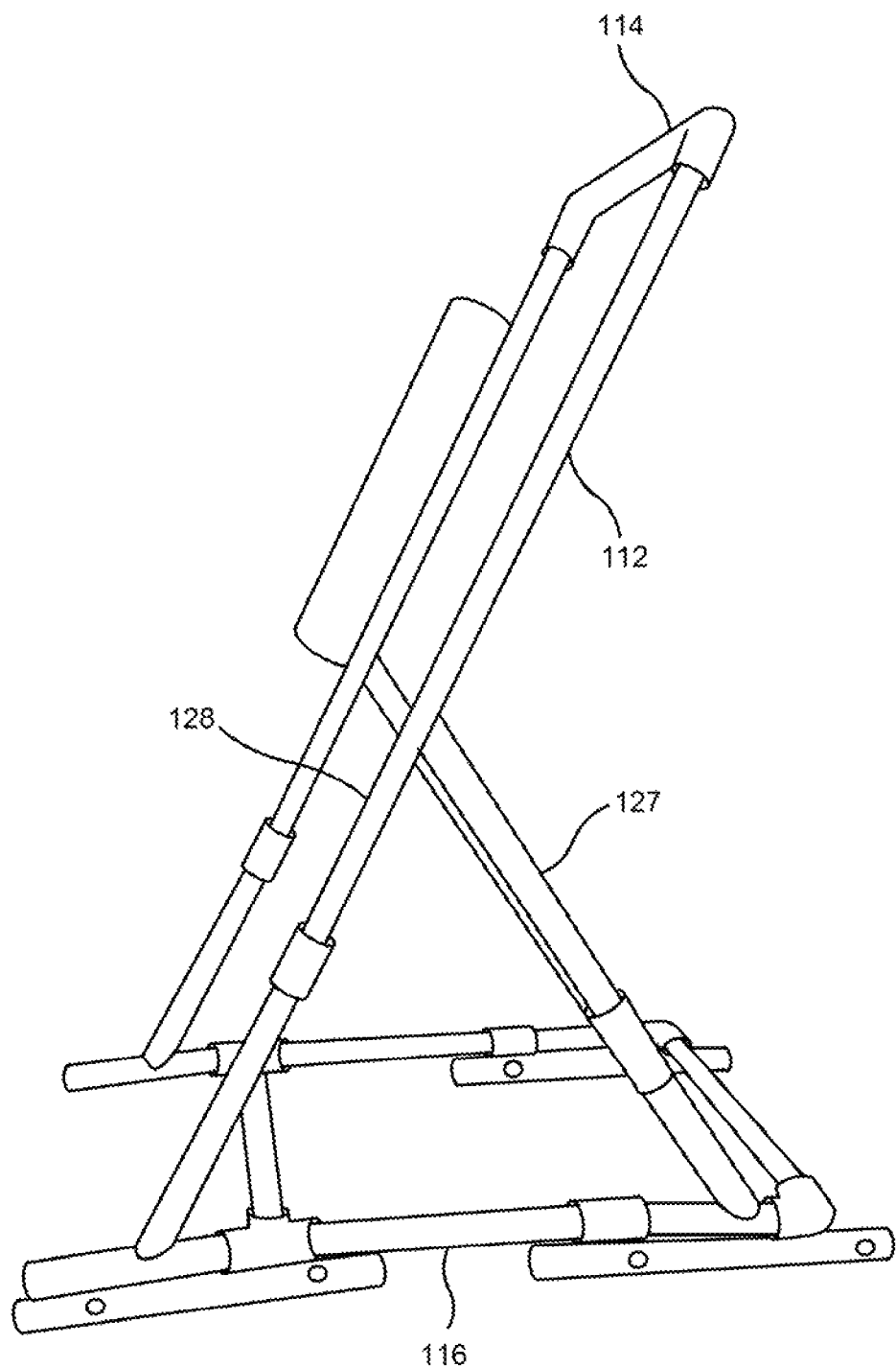
FIG. 15 is a side view of a frame for a trailer wash apparatus, according to an illustrative embodiment.

Referring to FIG. 15, a side view of a frame 112 is shown according to an alternative embodiment. Frame 112 comprises base linkage 116, angled linkage 128 and another angled linkage 127. Linkages 116, 128 and 127 form an A-shape or a triangle shape, which may be a substantially equilateral triangle. A portion of linkage 128 extends beyond an intersection with angled linkages 127 to a height more suitable for supporting a handle 114. In alternative embodiments, linkages of the frame may make other shapes, such as an H shape, a Z shape, etc., when viewed from one or more different angles.

Returning to FIG. 1, crossbars 30 are shown connecting linkages 16, 26 and 28 to another set of linkages on a second side of apparatus 10 which may be of a similar configuration. Three crossbars 30 are used in this embodiment, though fewer or greater numbers of crossbars may be provided for optimal stability and minimum weight. Crossbars 30 also serve as mounting surfaces for one or more accessories or other components of apparatus 10, such as a prybar holder 32 which may hold a prybar 34 usable by an operator to dislodge portions of pallets or other large debris that may become lodged in a ridged bottom surface of a trailer. In some embodiments, the weight of apparatus 10 is less than about 35 pounds, less than about 50 pounds, or less than about 75 pounds.

Figure 6:
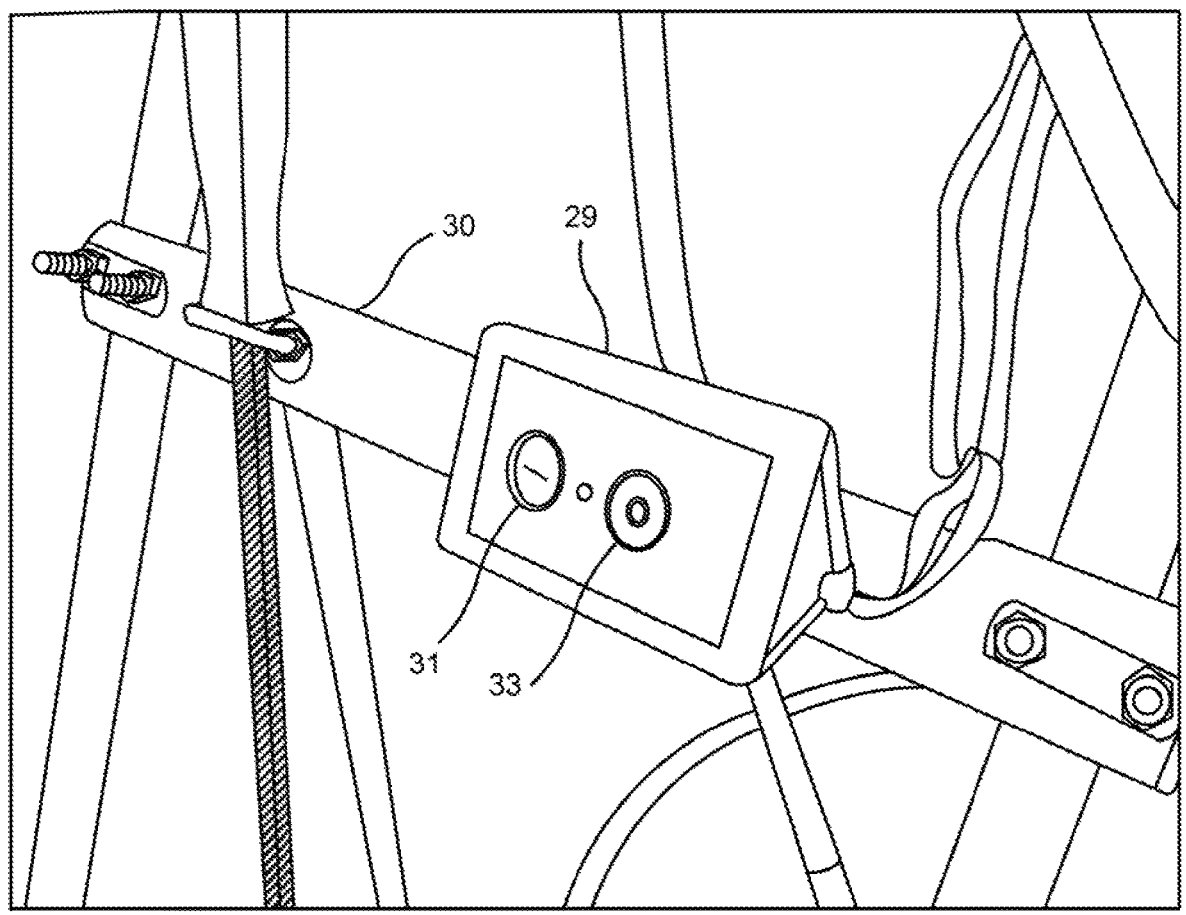
FIG. 6 is a perspective view of a start/stop switch for a trailer wash apparatus, according to an illustrative embodiment.

Referring to FIG. 6, crossbar 30 may act is a mounting surface and/or have a coupling or other device configured to hold a start/stop user input device 29. User input device 29 may be coupled mechanically, magnetically, adhesively, using Velcro, or otherwise to crossbar 30. A human operator may use buttons 31 and 33 to start and stop, respectively, a pump providing pressurized fluid to apparatus 10. User input device 29 may communicate wirelessly (e.g., over a Wi-Fi, Bluetooth, Zigbee, or other wireless protocol) or via a wired communication link with the pump, for example via a wire coupled externally to a hose bringing pressurized fluid from the pump to apparatus 10. Remote start device 29 may be coupleable to the frame and removable from the frame. Remote start device 29 may be configured to transmit start and stop signals to a fluid pump, wherein the fluid pump is configured to start or stop providing the pressurized fluid in response to the start or stop signals, respectively.

Referring again to FIG. 1, frame 12 may provide one, two or more couplers 36 disposed on the frame and configured to hold a hand sprayer 40. Hand sprayer 40 has a handle 42 and a trigger 44 coupled to the handle. An elongate dispensing conduit 46 extends from handle 42 and terminates in a single nozzle 48. When trigger 44 is actuated by a human operator, pressurized fluid moves from a tube or hose 53 through handle 42 and conduit 46 and is projected from nozzle 48. Hand sprayer 40 may be configured to pressure wash with a pressure of at least about 500 pounds per square inch with at least about 1 gallon per minute. In a more preferred embodiment, hand sprayer 40 may spray at least about 4 gallons per minute with a pressure of at least about 600 pounds per square inch. Hand sprayer 40 allows an operator a convenient method of spot cleaning portions of a surface to be cleaned. Hand sprayer 40 may be mounted on the cart and may generate point spray of at least about 1 gallon per minute for spot cleaning.

Figure 5:
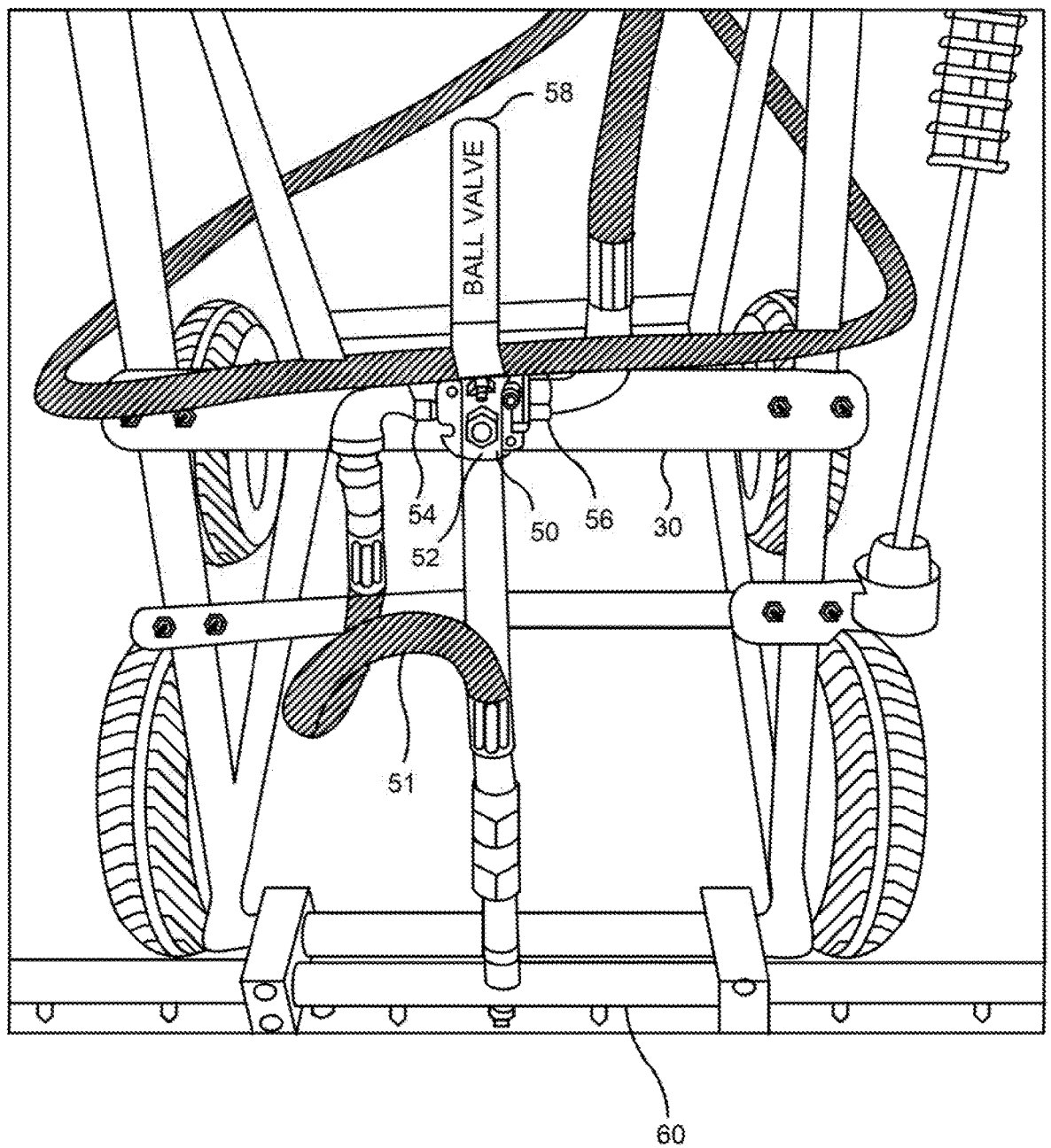
FIG. 5 is a front of a trailer wash apparatus showing a valve, according to an illustrative embodiment.

Another cross member may provide a surface for disposing a valve 50. Referring to FIG. 5, valve 50 is shown as a three-way valve configured to receive pressurized fluid at a first port 52 and to provide the pressurized fluid to one of a second port 54 to provide the pressurized fluid to a conduit 60 and a third port 56 to provide the pressurized fluid to hand sprayer 40. Hand sprayer 40 comprises its own valve actuated by the trigger and, therefore, when three-way valve 50 is directing pressurized fluid to the hand sprayer, water will either not flow or will flow at a trickle or reduce rate from apparatus 10 until the trigger is actuated, after which full pressure is achieved. In some embodiments, the hand sprayer valve is configured to always or selectively allow flow from the hand sprayer 40 regardless of the position of the valve, to avoid build-up of pressure in the system and damage to the pump. This state can serve as an "off" state of valve 50. A handle 58 extends from valve 50 to determine the state of valve 50. Handle 58 is sized to be operated by a human hand or foot. Handle 58 may be turned one-quarter turn (e.g., approximately 90 degrees) to select from one setting or operation to another setting or operation. In the configuration shown, three-way valve 50 is an L-type valve with pressurized fluid flowing in port 52 and out port 56 to the hand sprayer. Turning the handle down and toward right or toward port 56, a ball within the valve is moved such that the water is flowing in port 52 and out port 54. For example, a one quarter turn may configure the valve for hand spray operation (e.g., at one gallon per minute, or some other volume rate), and another quarter turn may configure the valve for dispensing a detergent or disinfectant through the conduit or through a separate nozzle. In other embodiments, two-way valves, four-way valves or other valve types may be used. T-type, L-type or other types of valves may be used in various embodiments.

In some embodiments, a valve is coupled to a cross member of the frame, the valve comprising a handle configured to select between pressure washing via the conduit and pressure washing via the hand sprayer.

Figure 16:
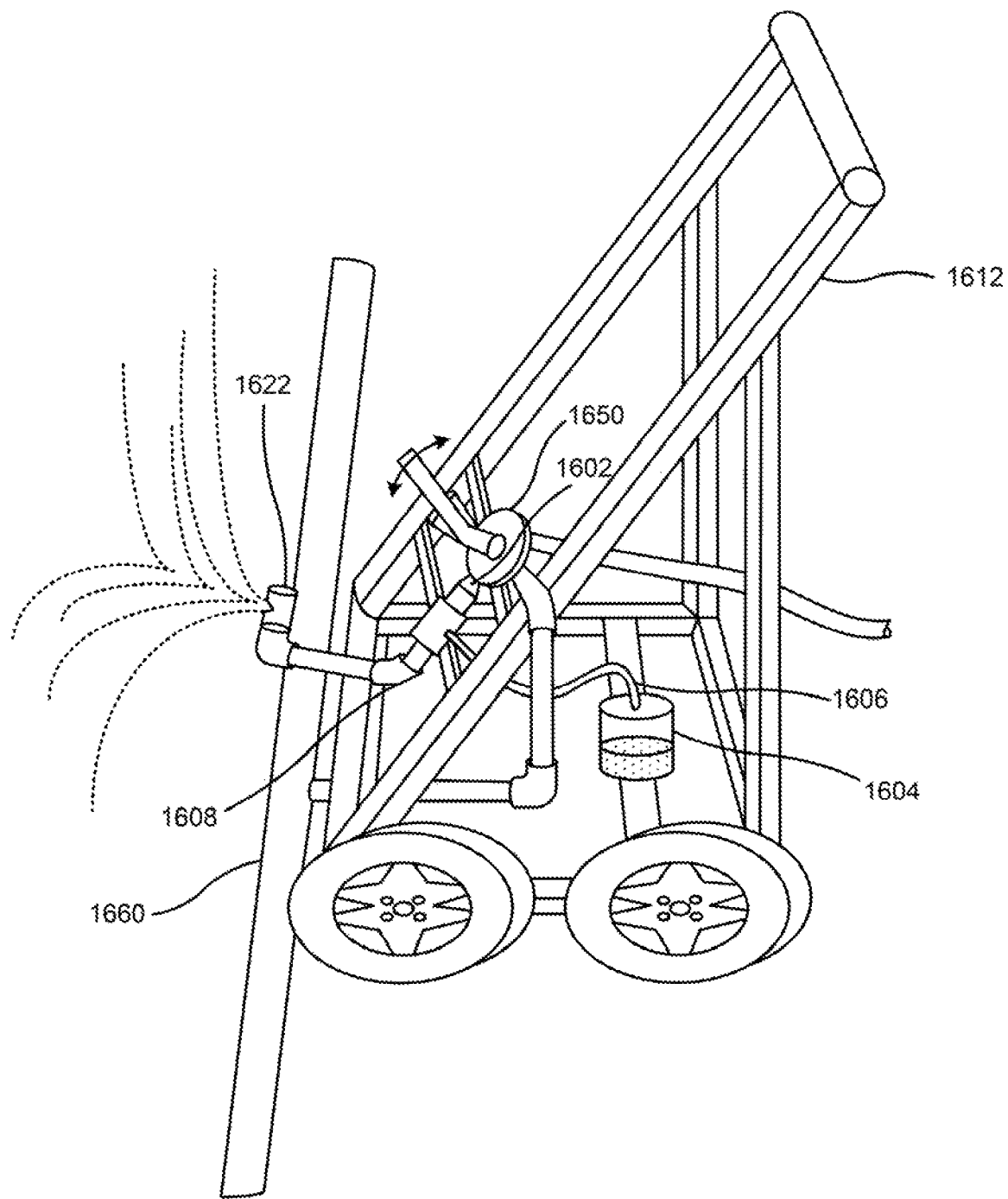
FIG. 16 is a perspective view of a trailer wash apparatus having a cleaning solution dispenser, according to an illustrative embodiment.

Referring to FIG. 16, a four-way valve 1650 may be used, in which a fourth port 1602 may be configured to provide an alternative spray that receives a detergent or other cleaner from a source of detergent 1604 (e.g., a container mounted on the frame 1612) via a hose 1606 and is siphoned to an output line 1608 from valve 1650. The detergent, cleaner, or sanitizer may alternatively siphon to conduit 1660, a hand sprayer and/or one or more additional nozzles 1622 disposed on a portion of frame 12 and not on conduit 60. Detergent may comprise a soap or other cleaning solution. Alternatively, sanitizer, such as a mild acid solution, may be provided via the siphon apparatus, or other soaps, disinfectants, or other solutions. In some embodiments, a detergent spray nozzle 1622 may provide a wide, flat spray pattern to cover any of a plurality of known trailer widths. Nozzle 1622 may be configured to dispense a detergent. For example, a Rocket Injector nozzle manufactured by DEMA Engineering Company, St. Louis, Mo. may be used. In another example, a Chem-Flex Injector nozzle made by Hydra-Flex Inc., Eagan, Minn. may be used. Such injectors may comprise one or more different sized orifices to meter the dispensing of detergent or sanitizer.

Referring again to FIG. 1, a conduit 60 is coupled to valve 50 via a hose 51. Conduit 60 may be coupled to the frame (e.g., using mechanical couplers, welds, or other fasteners) and may extend transversely across a direction of travel 61 of the apparatus. Conduit 60 comprises a plurality of nozzles 70 configured to pressure wash a surface on which apparatus 10 travels. In some embodiments, conduit 60 comprises at least eight nozzles configured to pressure wash the surface. In some embodiments, conduit 60 comprises at least two nozzles configured to pressure wash the surface. Apparatus 10 may be configured to pressure wash with a pressure of at least about 500 pounds per square inch with at least about 6 gallons per minute. In some embodiments, apparatus 10 may be configured to pressure wash with a pressure of at least about 1000 pounds per square inch with at least about 8 gallons per minute. With conduit 60 extending transversely across a direction of travel 61, the plurality of nozzles are configured to pressure wash a surface on which the apparatus travels.

Apparatus 10 may be configured to dispose the nozzles within about three to about twelve inches of the surface to be washed. In some embodiments, apparatus 10 may be configured to dispose the nozzles less than about six inches from the surface to be washed to provide improved washing pressure.

Figure 2:
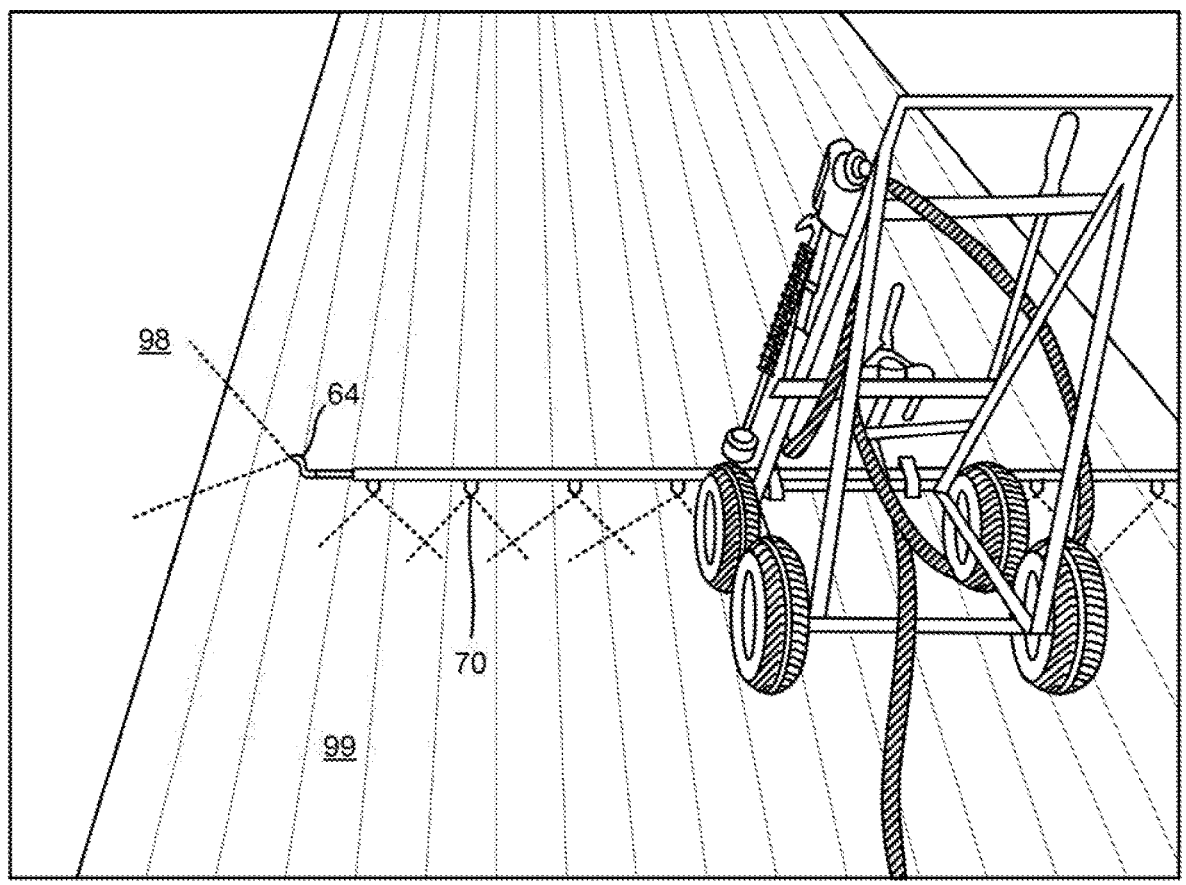
FIG. 2 is a rear perspective view of the trailer wash apparatus of FIG. 1, according to an illustrative embodiment.

Conduit 60 may be coupled to an end piece 62, shown here as an elbow joint, configured to channel pressurized fluid from conduit 60 to an end nozzle 64 disposed in a different direction than nozzles 70. For example, end nozzles 64 may be disposed on each end of conduit 60 configured to dispense pressurized fluid in a fan spray pattern at least partially horizontally to pressure wash side walls of the trailer. In some embodiments, the end nozzles are configured to wash at least about a three feet height of the side walls from the bottom of the trailer when the wheels are disposed on the bottom of the trailer. Conduit 60 may be at least about 70 inches long. Conduit nozzles 70 and end nozzles 64 may be disposed in sufficient number and orientation to power or pressure wash a floor of a trailer and a portion of the sidewalls of the trailer (e.g., at least about 1 foot, at least about 3 feet, less than about four feet, and/or other heights) in a single pass of apparatus 10 through the trailer. As shown in FIG. 2, a rear view of apparatus 10 shows end nozzle 64 spraying a wall 98 of the trailer and nozzles 70 are shown spraying a bottom or floor 99 of the trailer.

Figure 3:
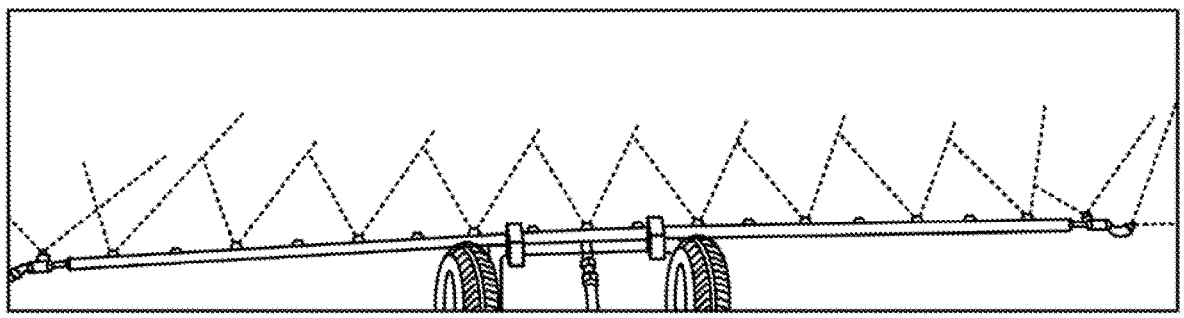
FIG. 3 is a top view of a sprayer conduit, according to an illustrative embodiment.

In the embodiment of FIG. 3, a conduit is shown having ten nozzles for dispensing pressurized fluid in a downward direction and two end nozzles for dispensing fluid substantially normal to the ten nozzles.

Figure 4:
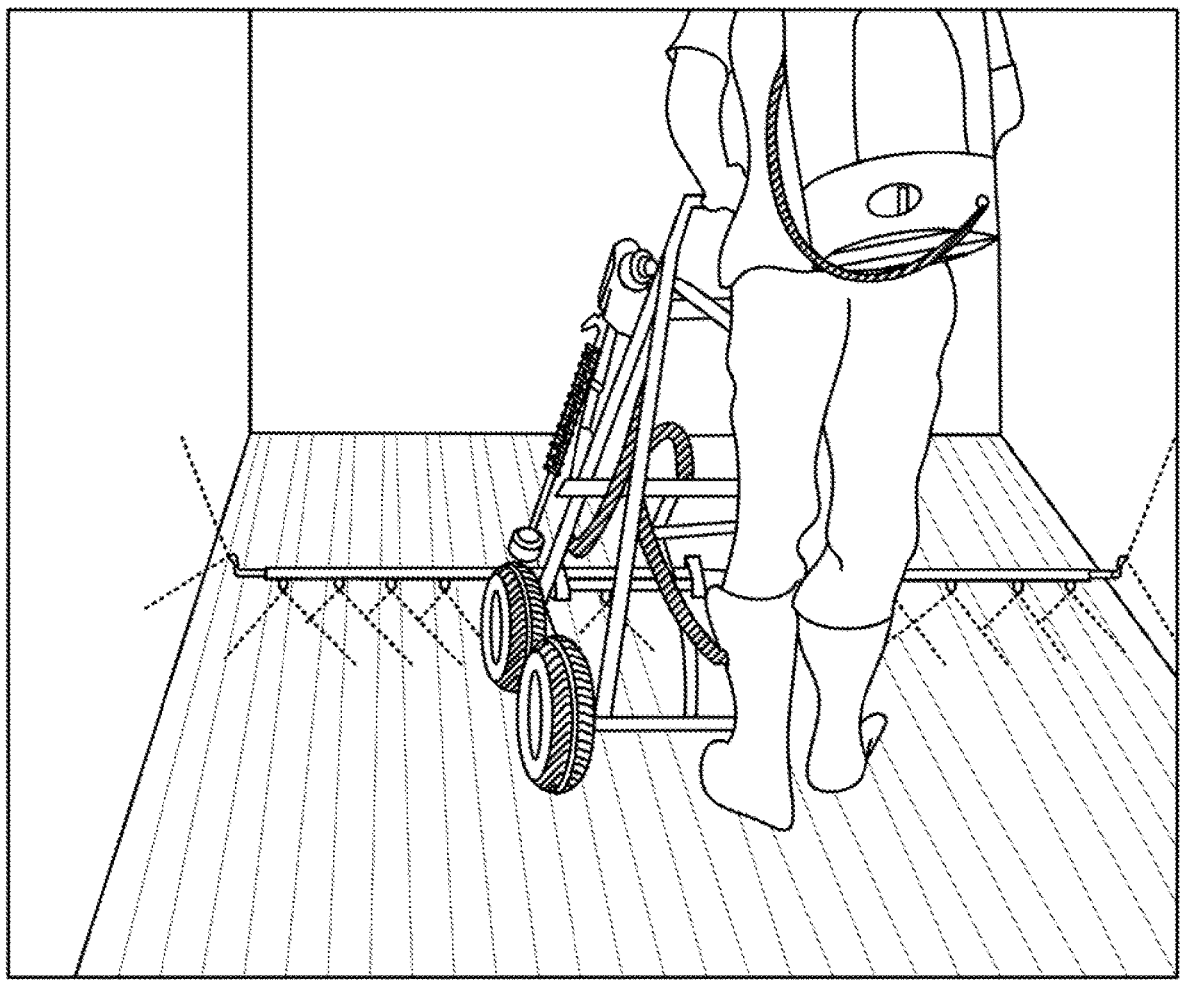
FIG. 4 is a rear perspective view of a trailer wash apparatus in use, according to an illustrative embodiment.

As shown in FIG. 4, one pass through a trailer interior with apparatus 10 provides pressurized fluid to a substantial portion of a bottom surface of the trailer and to a portion of the sidewalls of the trailer, including the corners therebetween.

Referring now to FIGS. 11 through 14, additional embodiments of nozzles 70 will be described. In some embodiments, nozzles may be configured to provide a fan spray pattern (e.g., a flat spray formed by an elliptical or round orifice on a deflective surface tangent to the exit orifice, a tapered flat spray, an even flat spray, or other fan sprays which may use other mechanisms), though in alternative embodiments one or more of nozzles 70 may be configured to provide solid streams, hollow cones, full cones, multiple plume sprays, or other spray patterns. Nozzles 70 are configured to provide a spray pattern having a spray angle α (alpha). Spray angle alpha may be between about 20 degrees and about 170 degrees, or greater than about 35 degrees, or less than about 90 degrees, or about 40 degrees, in various embodiments. Apparatus 10 may be configured to provide overlapping spray (which overlaps a portion of the surface being sprayed when moved along the direction of travel 61) from nozzles 70 to bottom surface 99 by selecting spray angles, spray patterns, and distance d between nozzles 70 and bottom surface 99 (or between either surface of a corrugated floor and nozzles 70 or conduit 60).

Figure 19:
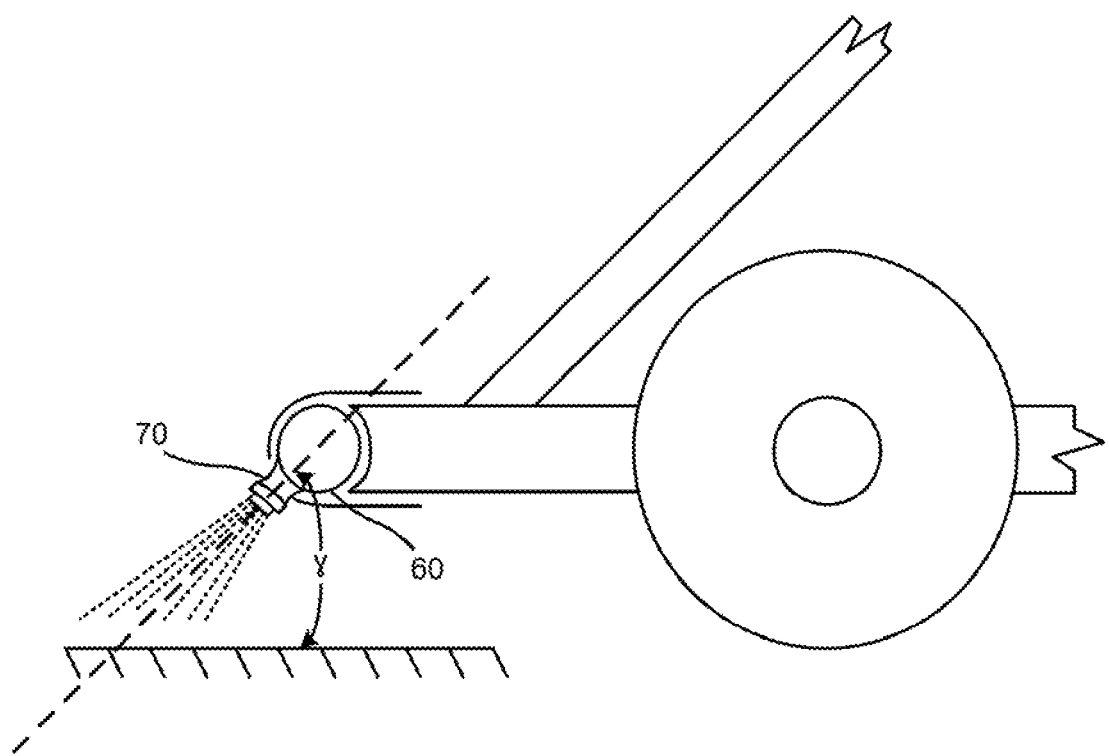
FIG. 19 is a side partial-cross sectional view of a sprayer nozzle, according to an illustrative embodiment.

In some embodiments, nozzles 70 may be disposed in fixed, non-adjustable positions and/or orientations on conduit 60. As shown in FIG. 19, nozzles 70 may be configured to spray the pressurized fluid at an angle γ (gamma) of between about 30 degrees and about 90 degrees up from the surface to be washed, when viewed from a side. In some embodiments, the fan spray nozzles may be set at an angle greater than about 30 degrees and/or less than about 60 degrees from the floor to clean and move the debris forward as apparatus 10 is moved across the floor to be cleaned.

Figure 12:
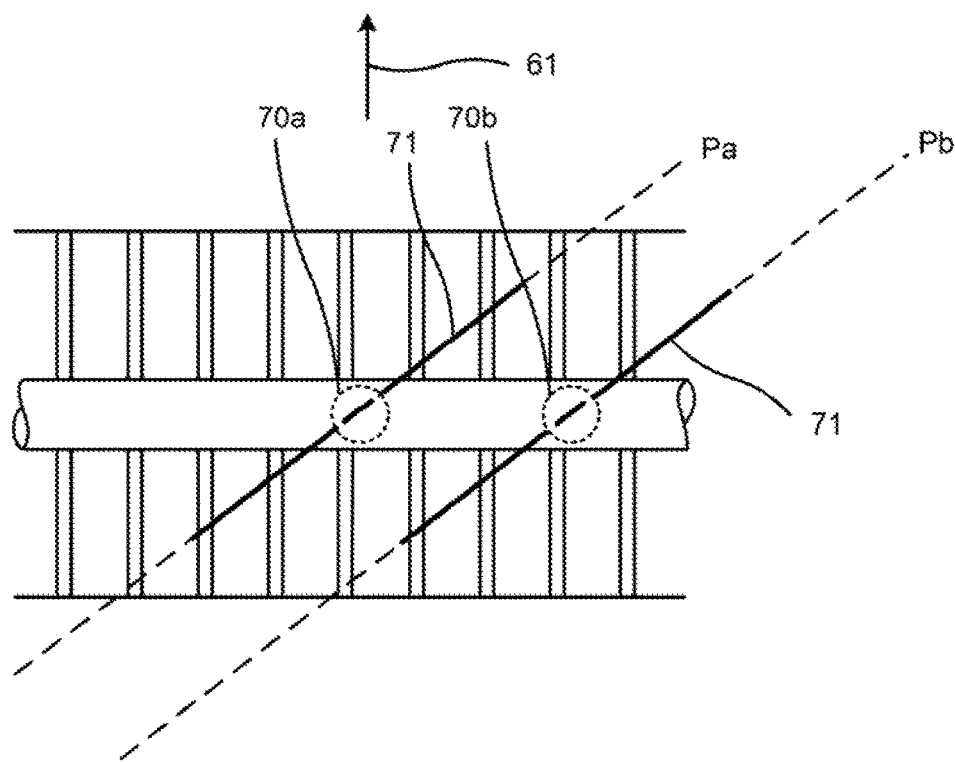
FIG. 12 is a top view of a spray conduit spraying a corrugated floor surface, according to an illustrative embodiment.

As shown in FIG. 12, nozzles 70 may be oriented so that spray patterns 71 of adjacent nozzles are configured to fan spray on different planes. A first nozzle 70a sprays fluid along a first plane Pa and a second nozzle 70b sprays fluid along a second plane Pb. Planes Pa and Pb may be parallel, or substantially parallel, as in the embodiment shown in FIG. 12. In some embodiments, adjacent nozzles are configured to fan spray on bisecting planes.

Figure 13:
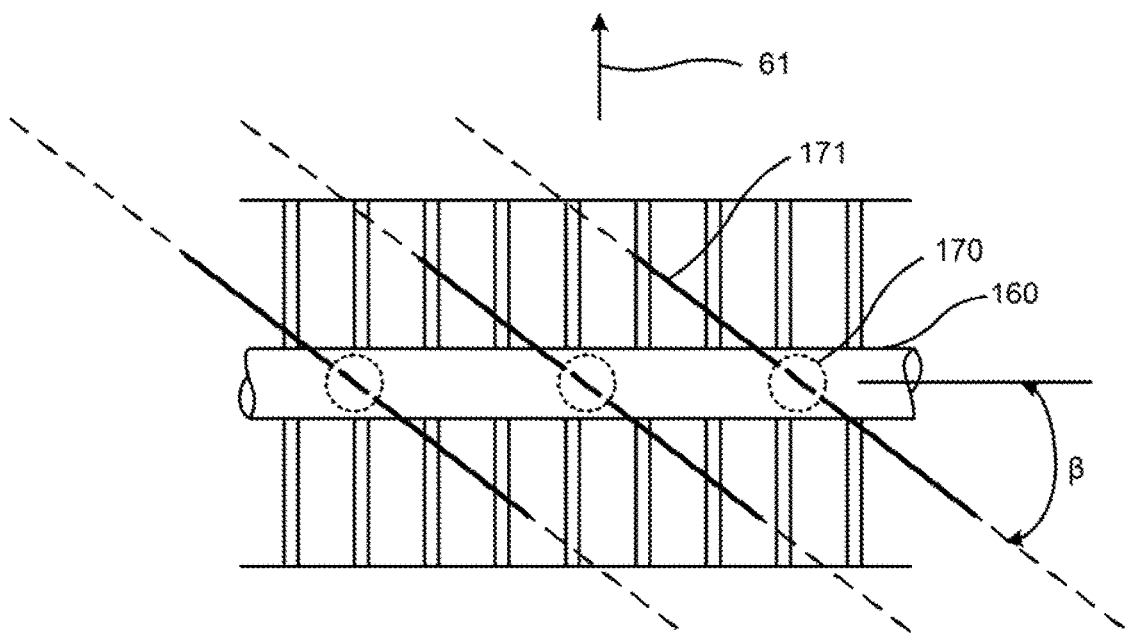
FIG. 13 is a top view of a spray conduit spraying a corrugated floor surface, according to an illustrative embodiment.

As shown in FIG. 13, nozzles 170 may be oriented so that spray patterns 171 are provided along an angle β (beta) of at least about two degrees, of less than about 30 degrees, of at least about 10 degrees, or at other angles relative to an axis on which conduit 160 is disposed. Spray patterns of adjacent spray nozzles may be substantially coplanar or differing within the range of about two to about thirty degrees, or differing outside of that range.

In some embodiments, a ribbed trailer bottom is washed from multiple nozzles and in multiple directions, due to the angled fan spray patterns described herein. Coplanar fan spray orientations (in which fan nozzles are positioned in line with each other) are provided in an alternate embodiment, but this arrangement may cause spray to interfere with spray from an adjacent nozzle, causing lost energy and potentially the loss of cleaning ribs from certain angles.

In some embodiments, conduit 60 acts as a spray bar which includes fan spray nozzles that provide spray patterns that cross each other to reach various points on the trailer ribs. The ribs are sprayed from multiple directions for a thorough cleaning.

In some embodiments, spray nozzles may be disposed within about four inches of each other, within about three inches of each other, or other distances from each other, across a portion or the entirety of the length of the conduit.

In some embodiments, spray bar 60 may be made from stainless steel with extruded threaded holes to install spray nozzles. Spray bar 60 may be sufficiently strong to withstand high pressure. The use of a single spray bar tube 60 may maximize pressure to nozzles 70.

Figure 18:
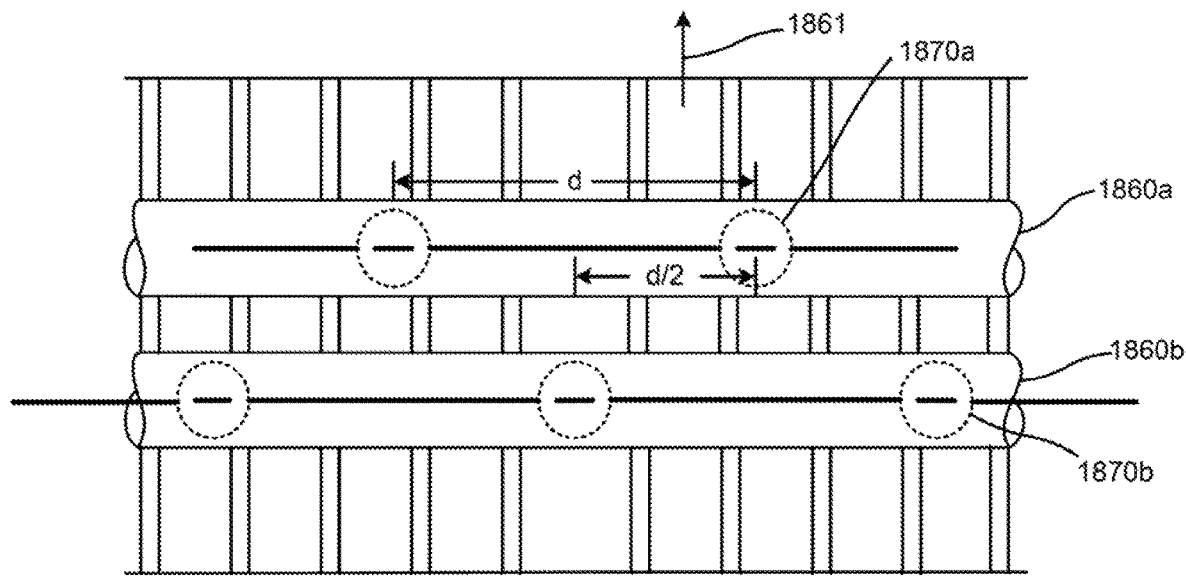
FIG. 18 is a top view of a double bar spray system, according to an illustrative embodiment.
Figure 18:
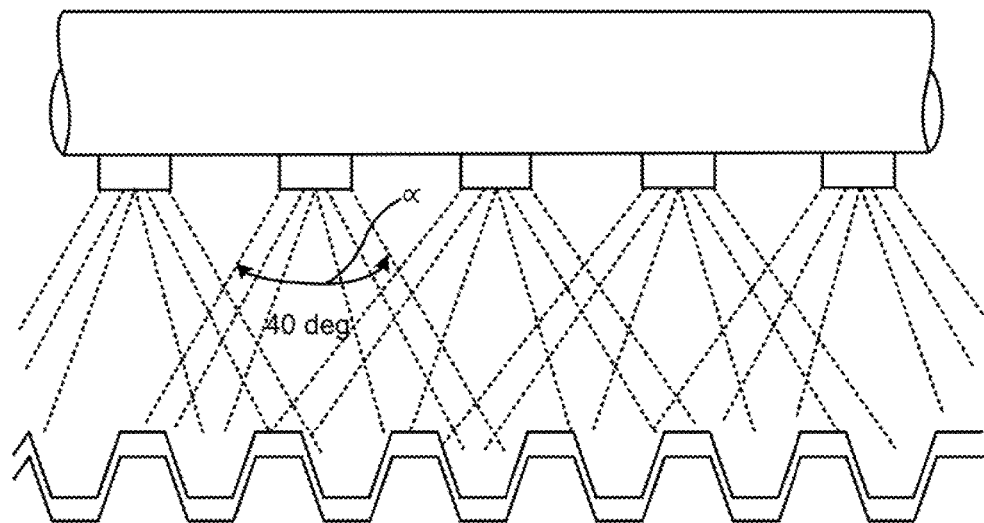

Referring to FIG. 18, a double bar spray embodiment will now be described. In this embodiment, a first conduit or spray bar 1860a is disposed on frame 12 (not shown) along with a second conduit or spray bar 1860b. Both spray bars 1860a, 1860b are provided pressurized fluid by a valve from the pump (not shown). Nozzles 1870a on spray bar 1860a are disposed a distance d apart and nozzles 1870b are disposed a distance of about d/2 from corresponding nozzles on spray bar 1860a so that spray from nozzles 1870b impinges on the floor between spray from nozzles 1870a as the device is moved in the direction of travel 1861. Each nozzle may have a spray pattern angle α of about 40 degrees, or between about 20 degrees and about 90 degrees, or at other angles in alternative embodiments. In this manner, nozzles 1870a provide fan spray patterns coplanar with others of nozzles 1870a, but due to the greater distance d (e.g., more than 9 inches, more than 12 inches, etc.), the spray patterns will not interfere. Likewise, nozzles 1870b may provide fan spray patterns coplanar with others of nozzles 1870b without interference or without substantial interference. Additional spray bars beyond two may be provided. Spray patterns other than fan spray patterns may be used in alternative embodiments.

Figure 7:
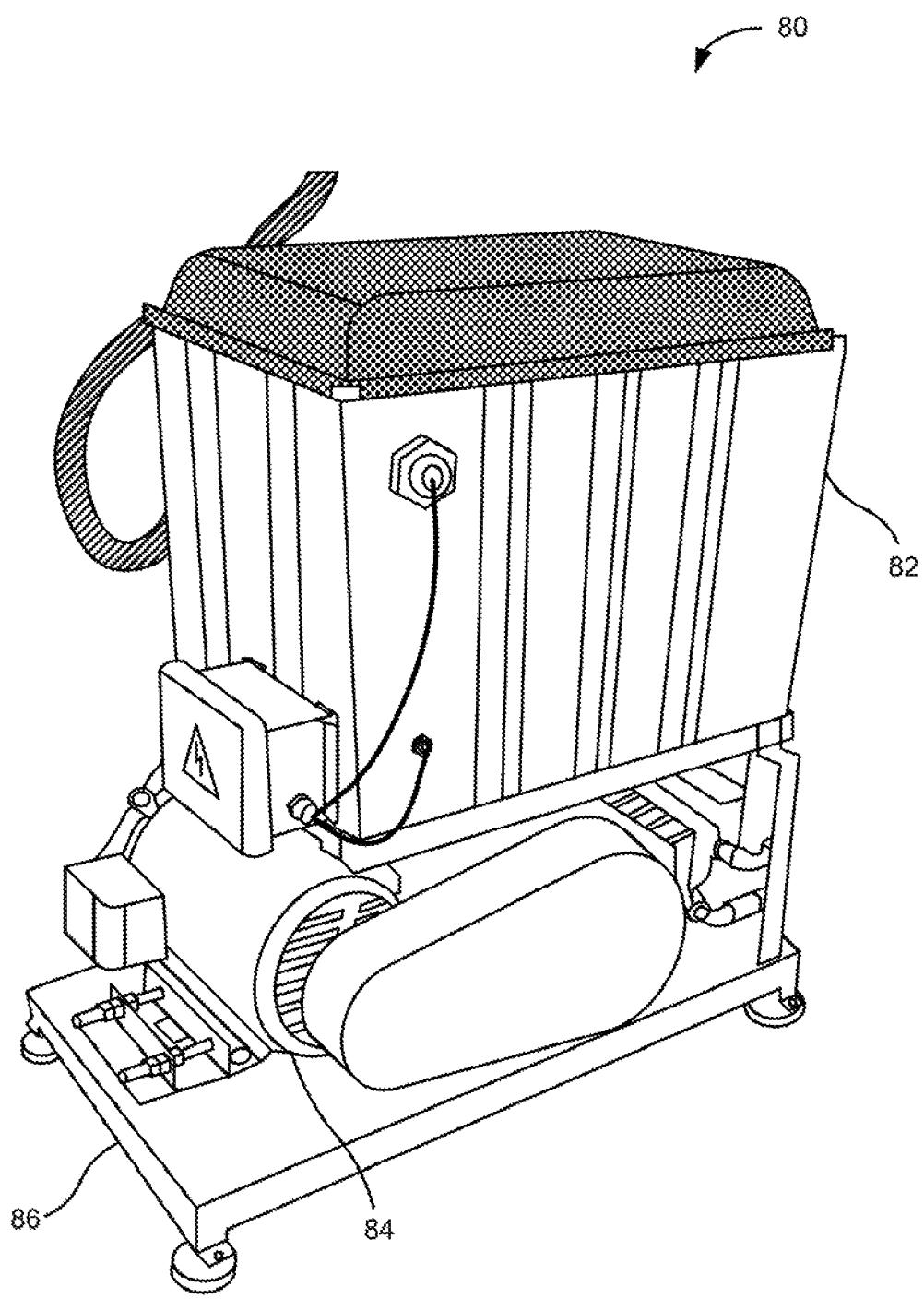
FIG. 7 is a perspective view of a pump for a trailer wash apparatus, according to an illustrative embodiment.

Referring now to FIG. 7, a fluid pump 80 for use with apparatus 10 will be described. Fluid pump 80 is configured to provide pressurized fluid, such as water, detergent, sanitizer, or other fluids via a hose to apparatus 10. Fluid pump may be disposed remotely from the frame of apparatus 10 and coupled to the first port of the valve via a hose configured to provide the pressurized fluid to the first port. Remote disposition may be provided by a hose of at least about twenty feet, at least about thirty feet, at least about fifty feet, or other lengths. In some embodiments, fluid pump 80 may be installed or carried on a wheeled trailer for improved portability.

In an alternative embodiment, a T-connector or splitter may be coupled between fluid pump 80 and apparatus 10 to direct pressurized fluid to both apparatus 10 and to a separate hand sprayer (not shown) separate from apparatus 10. The hand sprayer may be coupled to the T-connector with a hose of at least about twenty feet, at least about thirty feet, at least about fifty feet, or other lengths. In this manner, trailer wash apparatus 10 may be usable to wash a trailer while the separate hand sprayer usable to wash a hopper or other device having surfaces to be cleaned disposed remotely from the trailer being washed.

An illustrative wash system may comprise a cart apparatus 10, a hose and pumping station 80. The three elements may be tuned to each other. For example, if the hose is ½" at 13 gpm, there is a pressure loss of about 200 psi across the hose and 50 psi loss across various valves, etc. With 1000 psi input the spray bar is at about 750 psi, which is sufficient to pressure wash the floor. With a ⅝" hose the pressure loss is only 50 psi and the same 50 psi loss across various valves etc. results in pressure loss in the system of about 100 psi. The spray bar is then at about 900 psi, leading to a significant improvement in cleaning. In another embodiment, the apparatus may have 6 nozzles instead of 13 and a ½" hose, resulting in a pressure loss across the hose of 50 psi, plus the 50 psi loss across the spray nozzles, leading to a pressure in the spray bar of 900 psi. In various embodiments, performance can vary based on one or more of how many nozzles are used, the flow rate of the nozzles, the size of the hose, and the length of the hose performance. The three elements may provide at least 13 gallons per minute to a conduit having at least 13 nozzles at a pressure of at least 1000 pounds per square inch for maximum impingement for deep, fast cleaning. A sidewall spray may be provided to clean at least two or preferably at least three feet of side wall height. The hose may be a high pressure flexible hose, with a low friction and a high wearability cover such as ultra-high molecular weight polyethylene or tough flex hose.

Fluid pump 80 may comprise a tank 82 configured to hold at least about 20 gallons, or at least about 35 gallons of fluid in reserve for pumping. A motor 84 may be configured to draw power from a wall outlet (e.g., using three phase wiring, or using single phase wiring for plug-in to a welder's outlet or clothes dryer outlet) and to pump water from tank 82 through a hose to apparatus 10. Tank 82 and motor 84 may be supported by a frame 86, which may be a powder metal coated steel frame. Pump 80 may be configured with an electronic control circuit to receive stop/start control signals from a remote user input device to start and stop motor 84. In one embodiment, an UltraCompact High Pressure Pump Station provided by Washworld, Inc., DePere, Wis., may be used as pump 80. In some embodiments, the pump station is constructed with an emergency stop button or E-stop.

Figure 8:
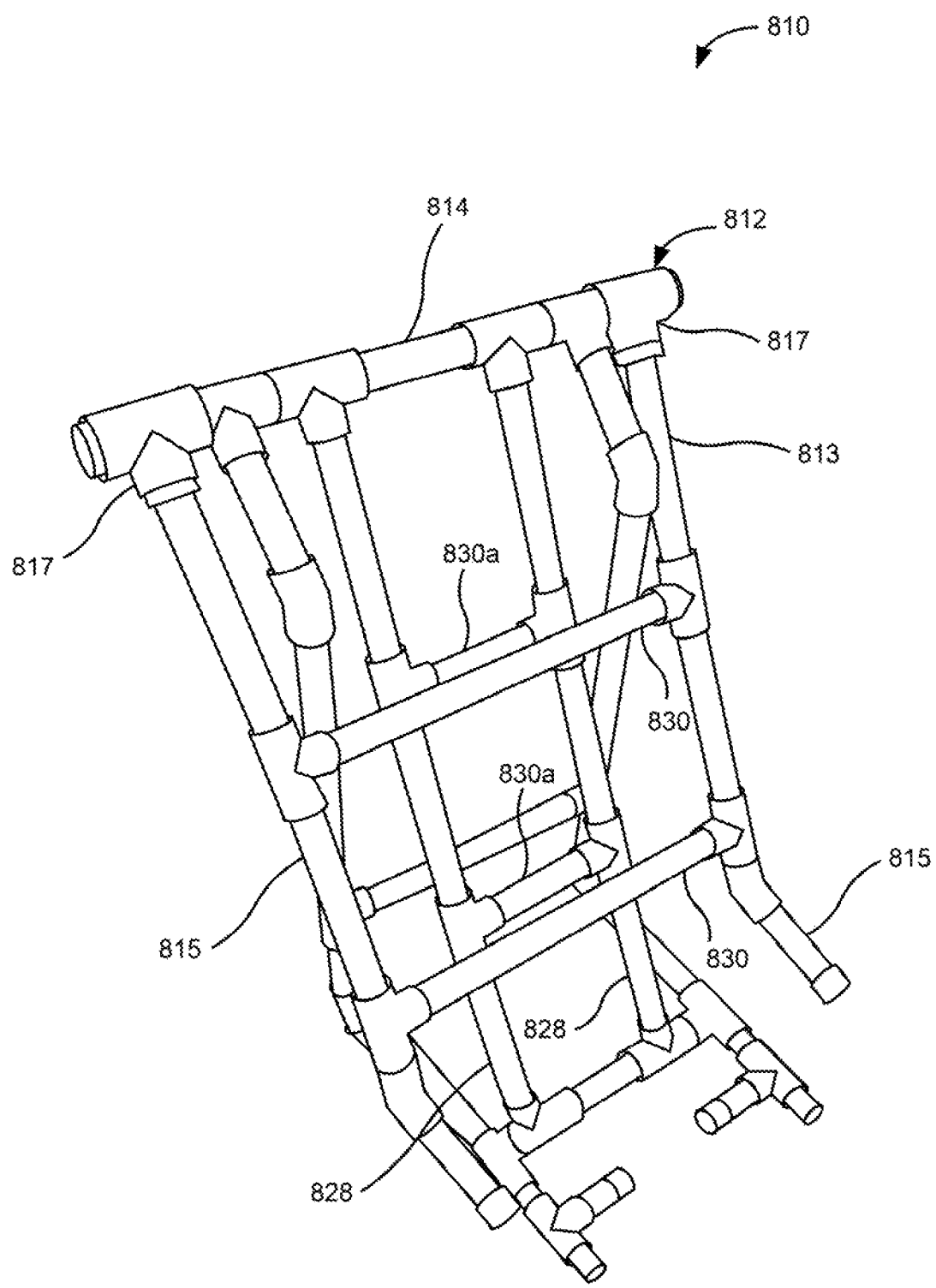
FIG. 8 is a perspective view of a frame for a trailer wash apparatus having a lift portion, according to an illustrative embodiment.

Referring now to FIG. 8, in some embodiments, the wash apparatus may comprise a lift portion to act as an aid to lift the apparatus into a trailer. The lift portion may be an extendable lift assist device. A floor of a trailer may be disposed between 53 and 59 inches above the ground that the trailer wheels ride on, while as mentioned, in some embodiments, handle 14 may stand at a height less than that of the trailer floor (e.g., 42 inches in some embodiments). Frame 812 may comprise a lift portion 813 extendable from and/or pivotable around handle 814 to act as an aid in lifting the apparatus 810 into the trailer.

In the embodiment of FIG. 8, lift portion 813 comprises side arms 815 which are pivotable at pivots 817 around an axis defined by handle 814. Side arms 815 extend downward along angled linkages 828 and fold or lift over angled linkages 828. Cross members 830 serve to provide structural rigidity to side arms 815. Pivots 817 may comprise bearings, rotatable joints, or other pivot mechanisms.

In some embodiments, cross members 830 and cross members 830*a* may further act as a ladder portion comprising a plurality of steps to allow a human operator to extend the lift portion upward, then climb the cross members 830*a* and 830 to enter the trailer.

Figure 9:
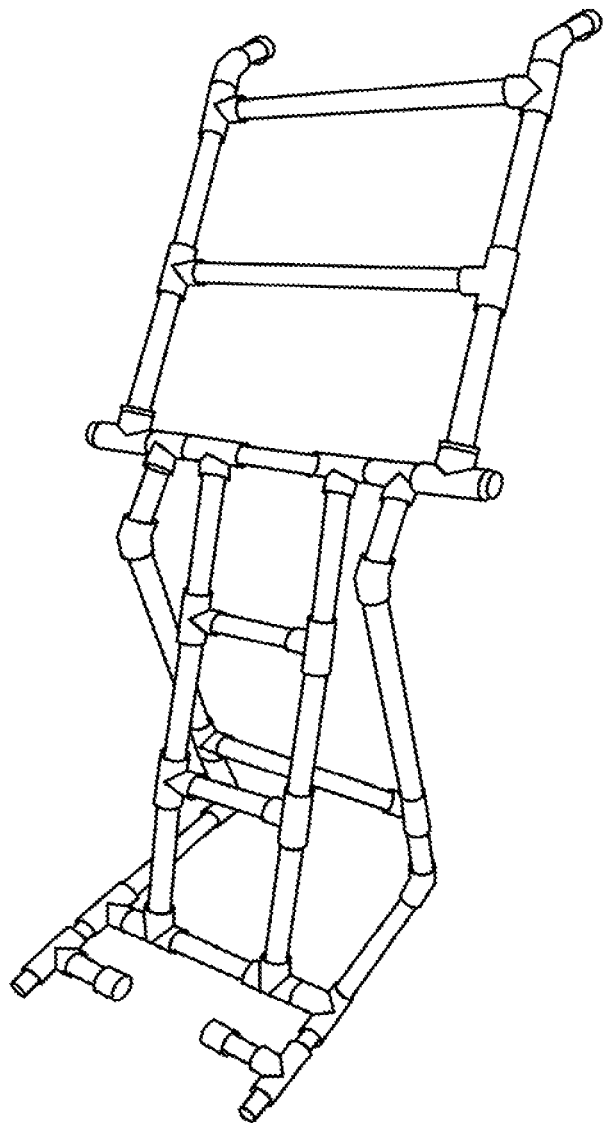
FIG. 9 is a perspective view of the frame of FIG. 8 in an extended position, according to an illustrative embodiment.

FIG. 9 illustrates apparatus 810 in its extended configuration. Side arms 815 can be angled at gripping ends thereof for ease of use by a human operator in the trailer to pull the apparatus upward by the gripping ends.

Figure 10:
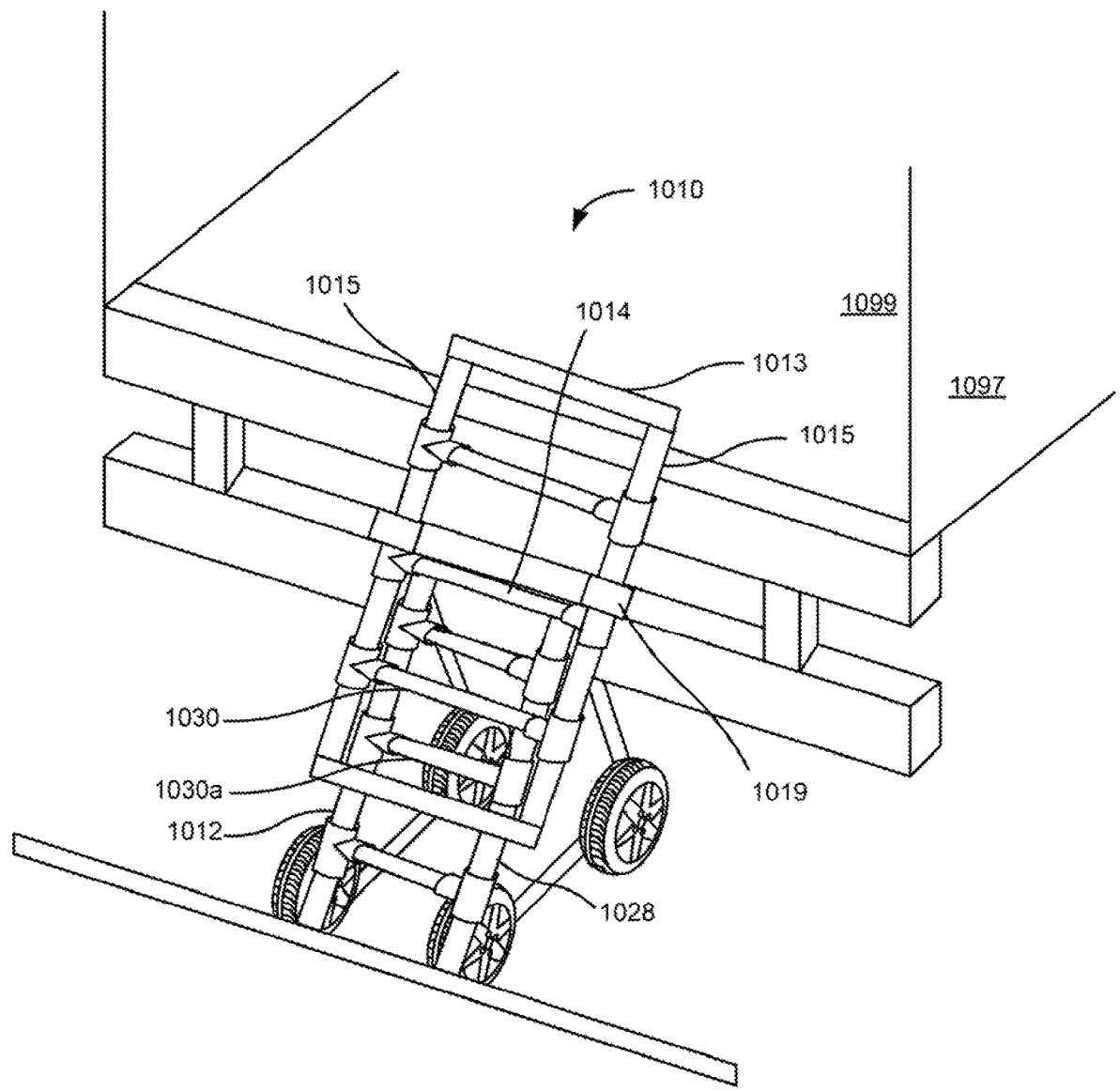
FIG. 10 is a perspective view of a trailer wash apparatus with extended lift portion for use with a trailer, according to an illustrative embodiment.
Figure 11:
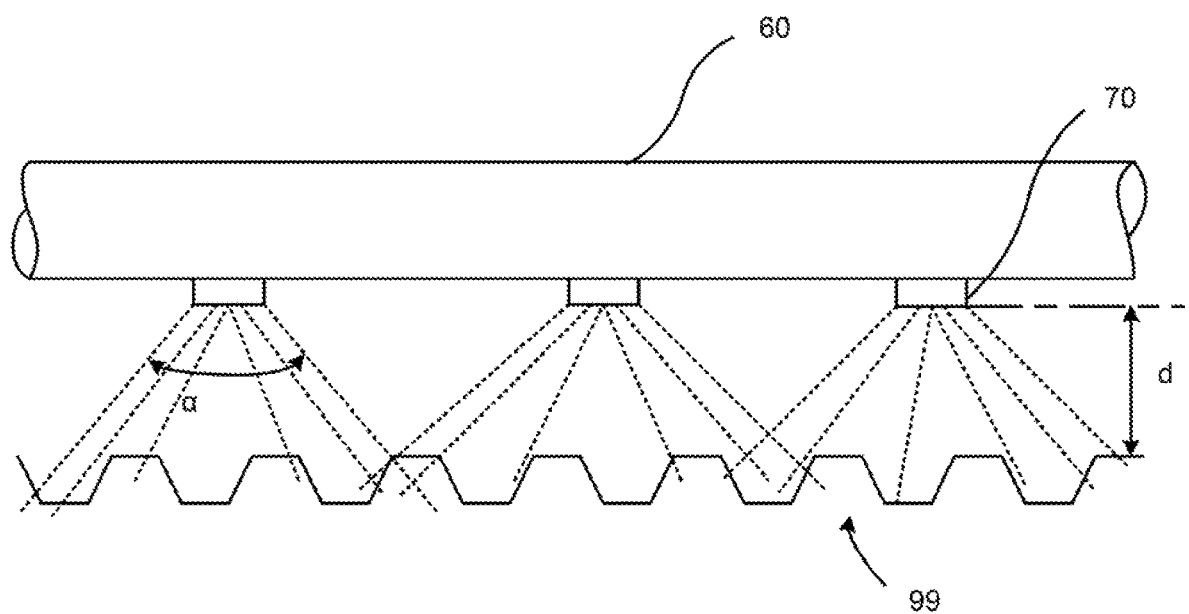
FIG. 11 is a front view of a spray conduit spraying a corrugated floor surface, according to an illustrative embodiment.

FIG. 10 illustrates apparatus 1010 with lift portion 1013 which is coupled for linear movement relative to frame 1012. Couplings 1019 hold side arms 1015 in a position slidable relative to frame 1012. In this manner, lift portion 1013 may be extended upward and locked into place to bridge the gap between handle 1014 and a floor 1099 of trailer 1097. A suitable locking mechanism may be configured to hold lift portion 1013 in its extended position and/or in its retracted position. In this embodiment, lift portion 1013 overlays frame 1012 in both extended and retracted positions, though in alternative embodiments lift portion 1013 may underlay frame 1012 or otherwise form a more compact unit when in the retracted position. The embodiment of FIG. 10 may also have crossbars 1030 and/or 1030*a* extending between sidearms of lift portion 1013 and/or angled sidearms 1028 for stability and rigidity of the structure and/or for use as a ladder for a person to enter trailer 1097.

Figure 14:
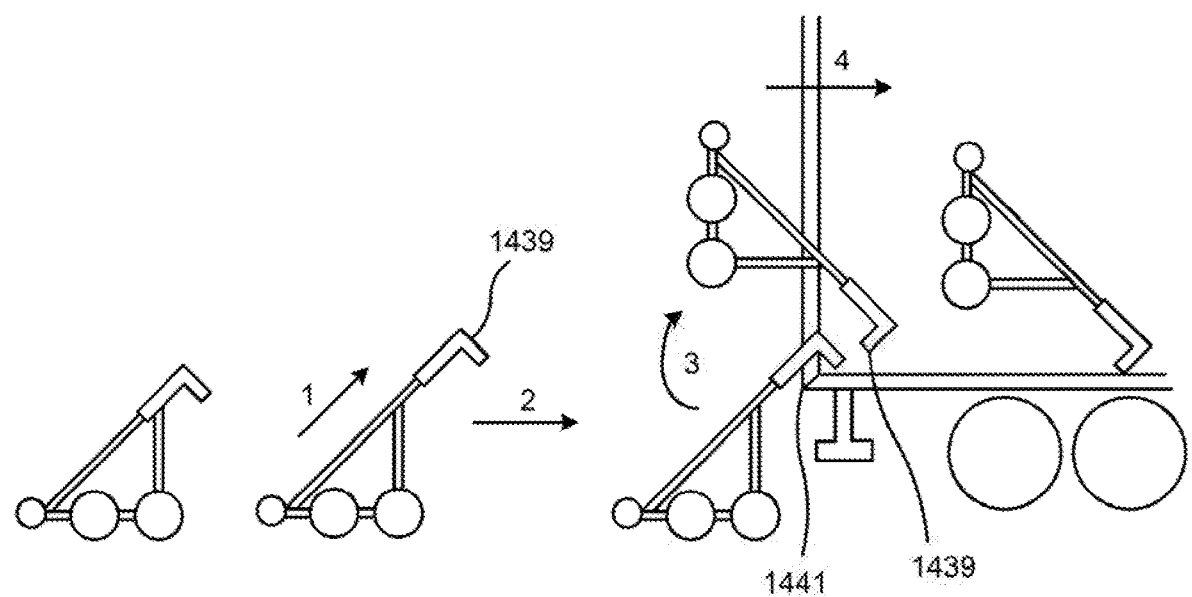
FIG. 14 is a schematic diagram of a method of loading a trailer wash apparatus into a trailer, according to an illustrative embodiment.

Referring now to FIG. 14, several steps in a method of loading a wash apparatus into a trailer will be described. At step 1, a lift portion is extended substantially upward and away from the frame. At step 2, a human operator manually moves the apparatus near an open trailer bed. In some embodiments, a curved portion 1439 may extend up and over a floor of the trailer bed for gripping by a human operator standing or kneeling within the trailer. At step 3, a portion of the weight of the wash apparatus is bore by a lip 1441 or edge of the trailer floor as the apparatus is pulled upward. This reduction in weight borne by the human operator makes lifting and insertion of the apparatus into the trailer easier. At step 4, the apparatus is pulled completely into the trailer, after which the apparatus may again be rested on its wheels and maneuvered into position for a washing process.

In other embodiments, the apparatus may be loaded into a trailer using other methods or mechanisms, such as a ramp, a trailer dock, a person or two persons on the ground lifting the apparatus, etc.

Figure 20:
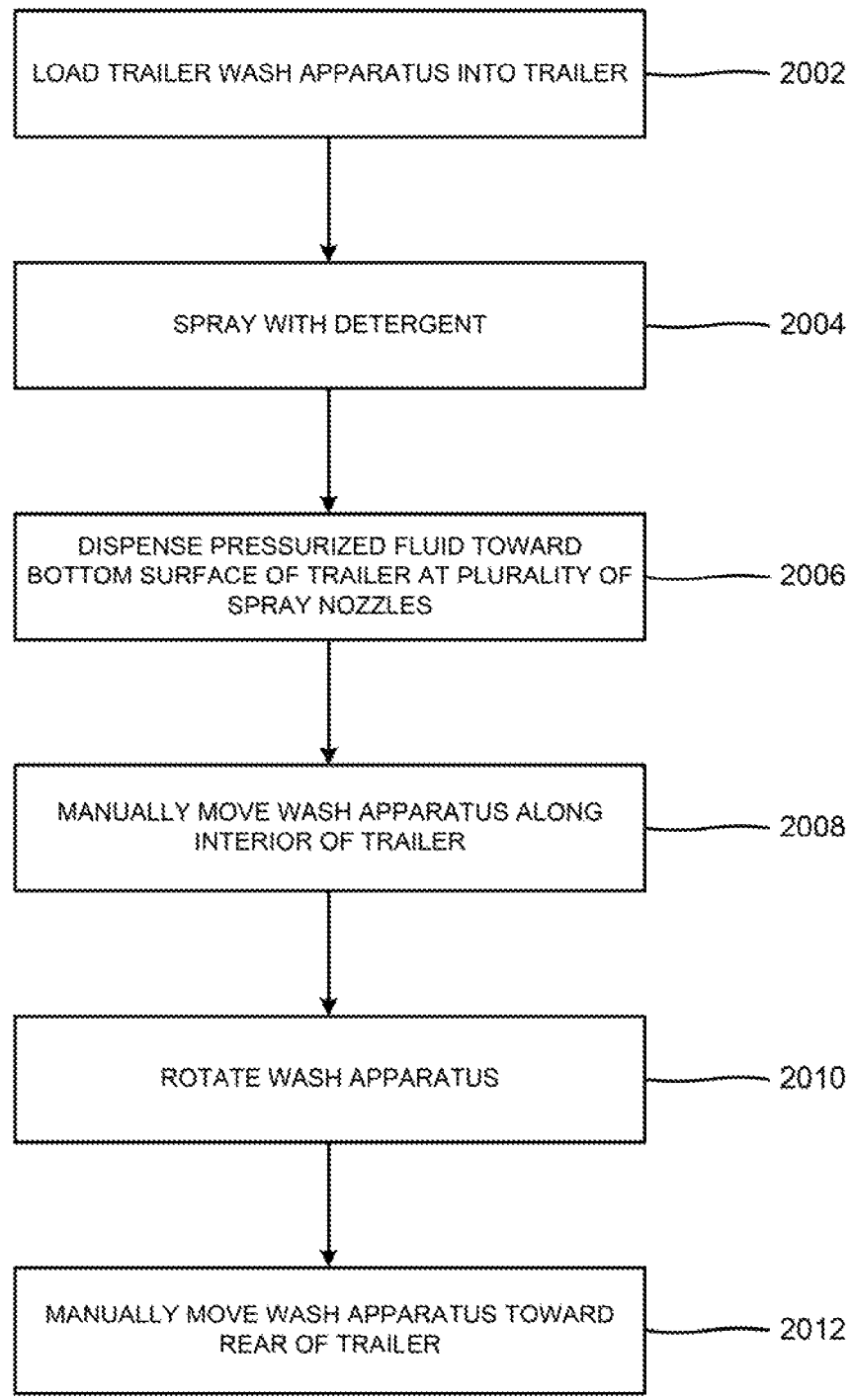
FIG. 20 is a flowchart showing a method of washing an interior of a trailer with a manually-operated trailer wash apparatus, according to an illustrative embodiment.

Referring now to FIG. 20, a method of washing an interior of a trailer using a manually-operated trailer washing apparatus will be described. At a block 2002, a trailer wash apparatus is loaded into an interior of a trailer. As described, the wash apparatus may be lifted into the trailer from a ground level or the apparatus may be rolled from a platform that is disposed approximately at a height of the floor of the trailer. In another embodiment, the wash apparatus may comprise a lift portion that is extended from a frame of the apparatus to a height greater than a floor of the trailer and thereafter pulled up and into the trailer by hand of a human operator. Other methods of loading may be used.

At a block 2004, the interior of the trailer may be sprayed with a detergent. The detergent may be sprayed at a low pressure or a high pressure, using the apparatus or using a separate detergent sprayer. The trailer may be sprayed with a detergent or other cleaner or other solutions. The detergent may be sprayed from spray nozzles on the frame configured to dispense a pressurized fluid, such as water, or may be sprayed from a nozzle and/or conduit configured to dispense the detergent separate from the nozzles and/or conduit configured to dispense the pressurized fluid. The detergent may be sprayed by moving the apparatus across a surface of the trailer, from rear or back of trailer to the front. The detergent may be left for a period of time to break down debris, or the detergent may be sprayed simultaneously with dispensed pressurized fluid.

At a block 2006, a pressurized fluid may be dispensed from the trailer wash apparatus toward a bottom surface of the trailer. The pressurized fluid may be dispensed at a plurality of spray nozzles disposed across a width of the bottom surface of the trailer, for example using a conduit extending a majority of the width of the trailer and using at least four, at least eight, or at least ten nozzles disposed along the length of the conduit. The pressurized fluid may be dispensed using any of the parameters or configurations disclosed herein. At a block 2008, the trailer wash apparatus is moved manually by a human operator along the interior of the trailer toward a front of the trailer. In some embodiments, the wash apparatus may be moved at speeds such as less than about 0.5 miles per hour, less than about 1 mile per hour, or less than about 3 miles per hour as pressurized fluid is dispensed in order to pressure wash the floor of the surface and/or a lower portion of walls of the interior of the trailer. In some embodiments, the trailer may have holes or drains disposed on the interior of the trailer, for example in the floor at a front end of the trailer, for draining the pressure wash fluid and/or detergent, to a ground beneath the trailer. The apparatus is moved under power of or by force applied by a human operator. In some embodiments, the apparatus is not moved under power of a motor or other powered drive device.

At a block 2010, the apparatus may be rotated manually or under power of a powered drive device. The rotation may be of the entire apparatus, for example by tilting the conduit upward at least 10 degrees, at least 30 degrees, etc. and rotating the apparatus approximately 180 degrees and/or to reverse a direction of movement thereof. Alternatively, the apparatus or a portion thereof may be rotated manually or using a powered drive mechanism (e.g., electric motor, gas motor, etc.) so as to rotate a conduit holding the spray nozzles in an opposite direction.

At a block 2012, the wash apparatus is moved manually toward a rear of the trailer to pressure wash any remaining debris off the floor and out a rear opening of the trailer. One or more of the steps described herein may be repeated as needed for additional washing, rearranged with other steps, or removed completely in various embodiments.

In some embodiments, the method may comprise adjusting a valve on the trailer wash apparatus to direct the pressurized fluid to a hand sprayer. The method may comprise moving a handle on the valve 90 degrees, or other rotational angles, to direct pressurized water through the valve to a hand sprayer extending from a hose coupled to the valve. In this way, the trailer interior may be spot cleaned or otherwise additionally cleaned using the hand sprayer. The valve on the trailer wash apparatus may then be adjusted to direct the pressurized fluid back to the plurality of spray nozzles on the conduit.

In some embodiments, the method may further comprise retrieving a pry bar or other tool from a tool holder on the trailer wash apparatus, removing debris from the interior of the trailer, for example from a corrugated floor of the trailer, and returning the pry bar to the pry bar holder. The pry bar may remain coupled to the frame of the wash apparatus during use or may be completely separated from the frame during use.

In some embodiments, a remote start button may be activated at the trailer wash apparatus to begin the flow of pressurized fluid. A remote stop button may be activated at the trailer wash apparatus to stop or substantially reduce the flow of pressurized fluid. The remote start and/or stop buttons may be integral to and inseparable from a frame of the wash apparatus or may be removable from a frame of the wash apparatus by way of a remote box removably attached to the frame. The start and/or stop buttons may communicate over wired or wireless communication circuits with a pump disposed remotely from the wash apparatus, for example, at least 5 feet away, at least 10 feet away, at least 30 feet away, etc., which may be coupled by a length of tubing for delivering the pressurized fluid from the pump to the wash apparatus.

While the embodiments are described herein with reference to cleaning or washing a trailer, the embodiments may be applied to other cleaning or washing applications as well, such as washing a floor of a warehouse or meat processing plant, a parking lot, a sidewalk, an arena, a manufacturing floor or any large surface needing cleaning or in recovery after natural disaster such as a flood or a hurricane.

In some embodiments, a complete washout of a trailer may be accomplished in under five minutes.

In some embodiments, high pressure, high volume water is delivered in a manually operated cart.

In various embodiments, the pressurized water may be any of a range of temperatures, from cold to warm to hot.

In certain applications such as a trailer which has transported frozen food or potatoes, debris in the ribs of the corrugated floor may require mechanical means such as a pry bar or push broom for removal. An embodiment of cart 10 includes deployable forks attached to frame 12 at a front end of cart 10. The forks are configured to fold down and fit between ribs to remove debris in the ribs in a quick method by pushing apparatus 10 in direction 61. Pressurized fluid is sprayed through conduit 60 while the forks are in the deployed position. The apparatus 10 is configured to be pushed down a length of the trailer with forks deployed remove debris.

Figure 21:
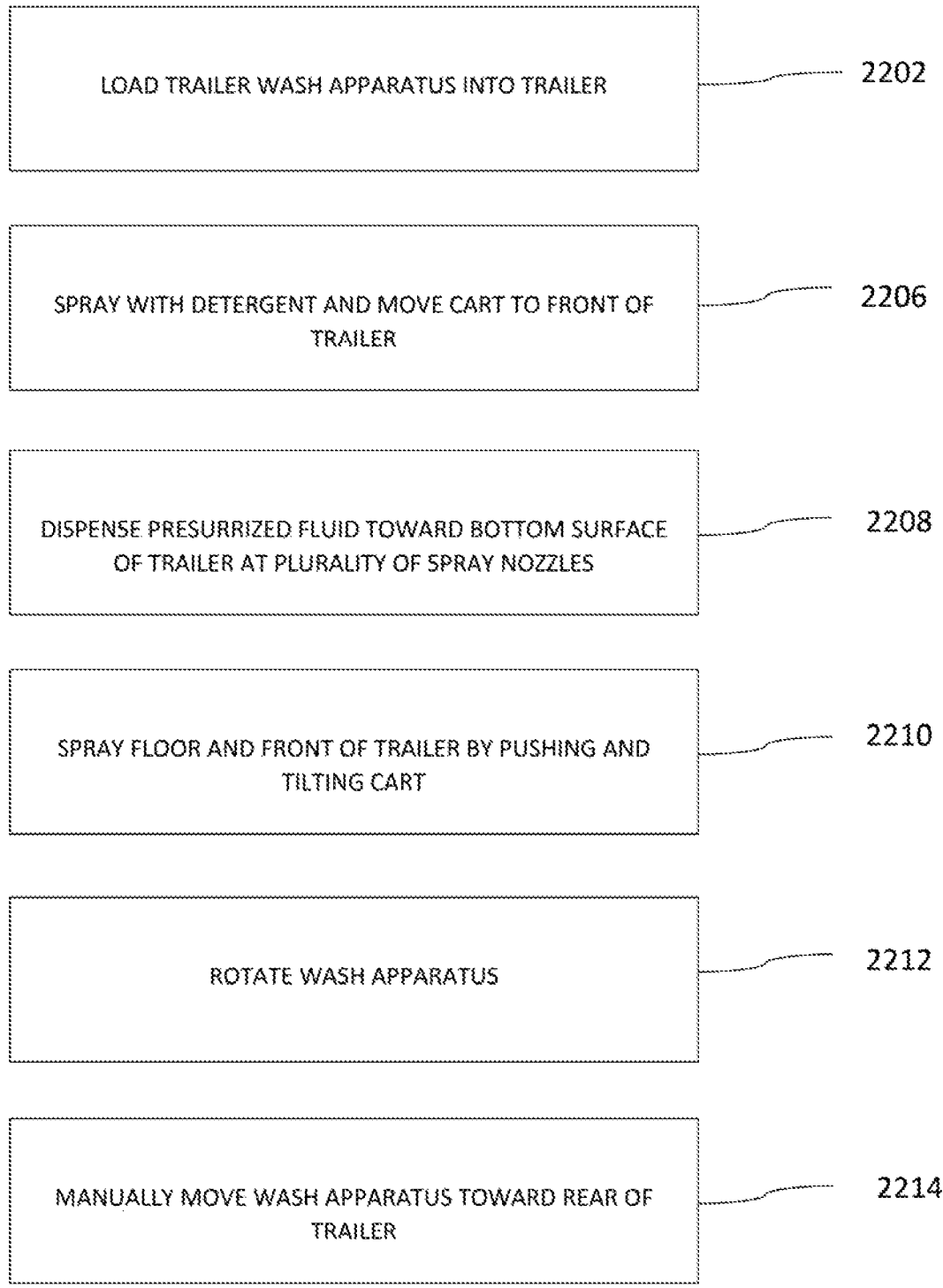
FIG. 21 is a flowchart showing a method of washing an interior of a trailer with a manually-operated trailer wash apparatus, according to an alternative embodiment.

Referring now to FIG. 21, a method of washing an interior of a trailer with a wash apparatus will be described according to an alternative embodiment. At a block 2202, the trailer wash apparatus is loaded into a trailer. The apparatus may be loaded manually or with the use of a hydraulic or electromechanical lifting apparatus. At a block 2206, a user may spray parts of the interior of the trailer with a detergent, either from the cart or from another apparatus like a backpack or agricultural sprayer, as the cart is moved to a front of the trailer (nearest the driver cabin). The user may wait a period of time before dispensing pressurized fluid, to allow the detergent to act on debris in the trailer. At a block 2208, a handle on the trailer wash apparatus may be moved from a detergent position to a pressure wash position and/or a start/stop button may be pushed to begin dispensing pressurized fluid. The pressurized fluid may be dispensed toward a bottom surface of the trailer from the plurality of spray nozzles. Block 2208 may be started when the trailer wash apparatus has already traveled at least 50 percent, at least 85 percent, or at least 90 percent of the distance from the rear of the trailer interior to the front of the trailer interior. At a block 2210, the user may spray a bottom surface of the remaining forward portion of the trailer interior. The user may also tilt the wash apparatus in a manner that directs spray from the nozzles upward toward a front wall panel of the trailer to wash at least a lower portion of a front wall panel of the trailer interior. At a block 2212, the user may rotate the wash apparatus when it is near the front wall of the trailer interior. At a block 2214, the user may manually move the wash apparatus toward a rear of the trailer to clean and move debris and pressurized fluid out the rear opening of the trailer.

In various embodiments, the steps described herein may be rearranged or certain steps omitted in alternative embodiments. Also, while manual operation is used for steps in various embodiments, one or more of the steps may be automated by modifying the wash apparatus or using additional devices to, for example, load the trailer wash apparatus into the trailer, switch a valve from a detergent-dispensing setting to a pressurized fluid-dispensing setting, automatically rotating the assembly when at the forward end of the rear (e.g., using a motor and suitable mechanical coupling), driving or moving the wash apparatus under the power of a force generator (such as an engine, transmission, etc.), etc.

Figure 22:
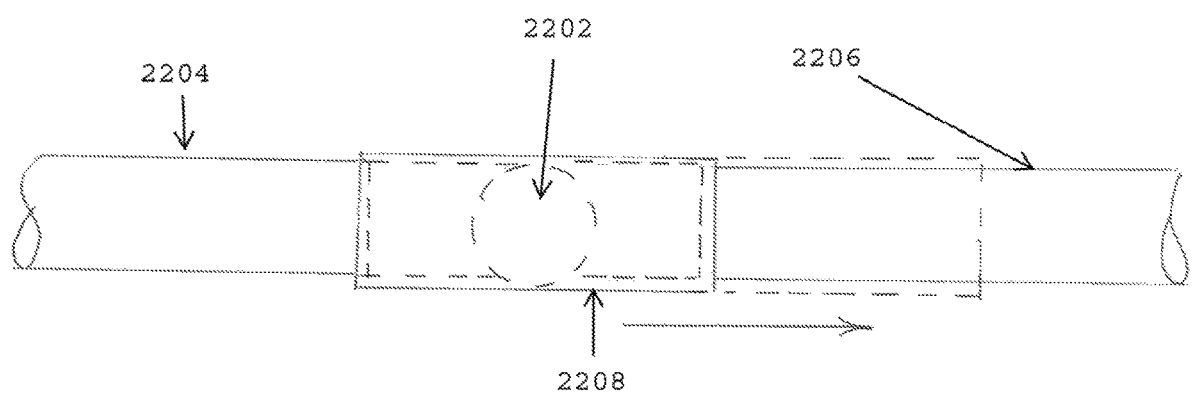
FIG. 22 is a side view of a coupling between a first portion and a second portion of a conduit, according to an illustrative embodiment.

Referring now to FIG. 22, the trailer wash apparatus may comprise a conduit or manifold comprising at least one coupling 2202 joining a center portion of the conduit 2204 to an end portion of the conduit 2206, the coupling configured join center portion 2204 to the end portion 2206 in a way that is at least partially foldable. Coupling 2202 may comprise a hinge, a rotatable coupling, a pivot coupling, a flexible tubing, or other coupling mechanism. A sleeve 2208 may be provided which is slidable between a locking position (shown) and an unlocking position (shown in dashed lines) to lock or release the coupling to allow the conduit to be folded at least partially into a position more suitable for storage. In one example, the coupling may comprise a No. 0087 hose swivel manufactured by Husky Corporation in Pacific, Mo. Other coupling mechanisms are contemplated. The end portion of the conduit may be at least partially foldable, for example by folding at an angle of at least about 10 degrees, at least about 30 degrees, at least about 90 degrees, or at least about 170 degrees.

Figure 23:
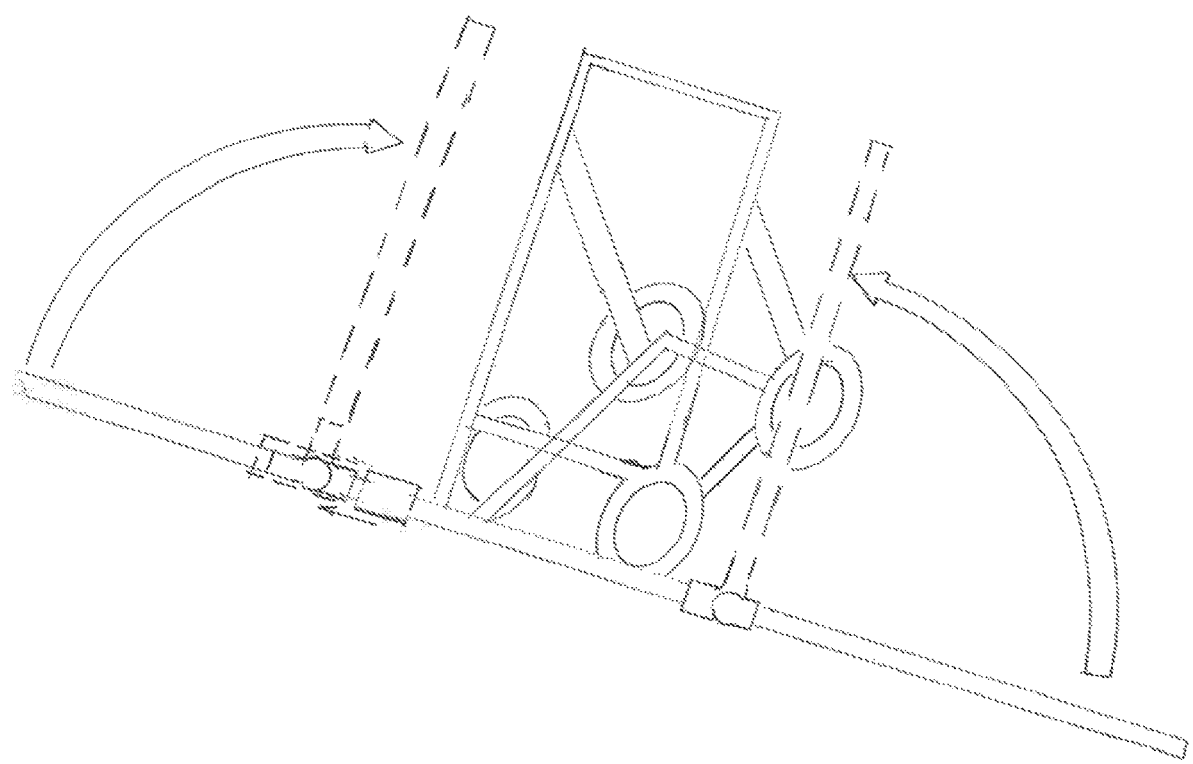
FIG. 23 is a perspective view of a trailer wash apparatus having a foldable conduit, according to an exemplary embodiment.

FIG. 23 is a perspective view of a trailer wash apparatus having a foldable conduit, according to an exemplary embodiment. In this embodiment, two coupling mechanisms are deployed between a center conduit portion and first and second end conduit portions. The end portions (which may be at least 10%, at least 20% or at least 30% in length of the length of the entire conduit from left end to right end) may be configured to be folded at least partially upward, backward, or in other directions. In this embodiment, the end portions fold upward in a coplanar with a front plane of the trailer wash apparatus (which may be inclined from a side view perspective). In other embodiments, the end portions may fold in a plane coplanar with the bottom of the wheels, with another part or parts of the frame, or in other directions. To deploy the end portions, the end portions may be folded down to be substantially coaxial with a longitudinal axis down the center portion of the conduit, and a collar or other lock mechanism may be moved into position to hold the end portions in their extended state.

Figure 24:
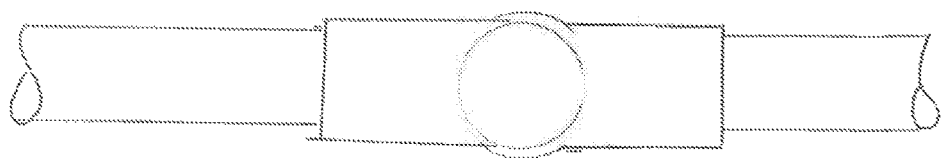
FIG. 24 is a top view of a coupling between a first portion and a second portion of a conduit, according to an exemplary embodiment.
Figure 24:
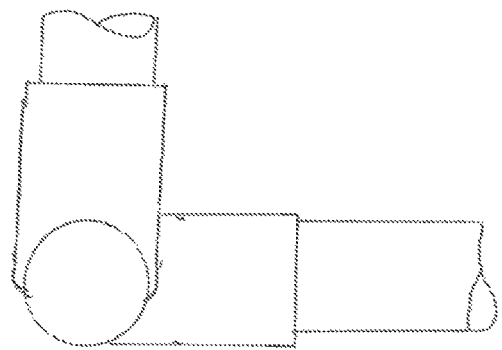

FIG. 24 is a top view of a coupling between a first portion and a second portion of a conduit, according to an exemplary embodiment. The coupling is shown in its extended or deployed position (top drawing) and in its retracted or storage position (bottom drawing). In some embodiments, in an extended position, the end portions of the conduit may be attached to the frame using an attachment mechanism such as a rope, a zip tie, a latch, a bracket, or other attachment mechanism.

In some embodiments, a manually-operated trailer wash apparatus for washing an interior of a trailer comprises a frame comprising a handle configured to be manually pushed by a human operator, at least one front wheel, at least one rear wheel, and rotatable couplings disposed between each of the wheels and the frame, the rotatable couplings configured to freely rotate the wheels in response to the manual pushing of the handle. The trailer wash apparatus may further comprise a conduit coupled to the frame and extending transversely across a direction of travel of the apparatus, the conduit comprising a plurality of nozzles configured to pressure wash a surface on which the apparatus travels. The trailer wash apparatus may further comprise a hand sprayer configured to be held in a hand of the human operator, a valve having a first port configured to receive a pressurized fluid, a second port configured to provide the pressurized fluid to the conduit, and a third port configured to provide the pressurized fluid to the hand sprayer.

The conduit may comprise an end nozzle on each end configured to dispense pressurized fluid in a fan spray pattern at least partially horizontally to pressure wash side walls of the trailer.

The end nozzles may be configured to wash at least about a three feet height of the side walls when the wheels are disposed on the surface to be washed.

The nozzles may be disposed in fixed, non-adjustable positions and orientations on the conduit. The nozzles may be configured to spray the pressurized fluid at angle of between about 30 degrees and about 90 degrees up from the surface to be washed.

The conduit may be at least about 70 inches long.

The trailer wash apparatus may further comprise at least one detergent nozzle configured to dispense a detergent from a detergent source.

The detergent nozzle may be coupled to the valve, wherein the detergent nozzle is disposed on a portion of the frame and not on the conduit.

In some embodiments, the conduit may be configured to dispose the nozzles within about three to about twelve inches of the surface to be washed.

In some embodiments, a method of washing an interior of a trailer with a manually-operated trailer wash apparatus comprises loading the trailer wash apparatus into the interior of the trailer, spraying the interior of the trailer with a detergent, and dispensing a pressurized fluid from the trailer wash apparatus toward a bottom surface of the trailer at a plurality of spray nozzles disposed across a width of the bottom surface of the trailer. The method may further comprise manually moving the trailer wash apparatus along the interior of the trailer toward a front of the trailer, rotating the trailer wash apparatus to face a substantially opposite direction. And manually moving the trailer wash apparatus along the interior of the trailer toward a rear of the trailer.

The method may further comprise manually tilting a conduit comprising the plurality of spray nozzles upward prior to rotating the trailer wash apparatus to face the substantially opposite direction. A detergent may be sprayed from the trailer wash apparatus.

The method may further comprise adjusting a valve on the trailer wash apparatus to direct the pressurized fluid to a hand sprayer, hand spraying the interior of the trailer using the hand sprayer, and adjusting the valve on the trailer wash apparatus to direct the pressurized fluid back to the plurality of spray nozzles.

The method may further comprise retrieving a pry bar from a pry bar holder on the trailer wash apparatus, removing debris from the interior of the trailer using the pry bar, and returning the pry bar to the pry bar holder.

The method may further comprise actuating a start and stop button at the trailer wash apparatus to begin the flow of pressurized fluid.

The method may further comprise dispensing the pressurized fluid from the trailer wash apparatus toward side surfaces of the trailer at a plurality of side spray nozzles disposed at opposite ends of a conduit comprising the plurality of spray nozzles.

While the embodiments have been described with reference to certain details, it will be understood by those skilled in the art that various changes can be made and equivalents can be substituted without departing from the scope described herein. In addition, many modifications can be made to adapt a particular situation or material to the teachings without departing from its scope. Therefore, it is intended that the teachings herein not be limited to the particular embodiments disclosed, but rather include additional embodiments falling within the scope of the appended claims.

The invention claimed is:

1. A manually-operated trailer wash apparatus specially adapted for manually washing an interior of a trailer, comprising:
   a frame comprising a handle configured to be manually pushed by a human operator;
   at least one front wheel configured to rotate in a fixed plane;
   at least one rear wheel configured to rotate in a fixed plane;
   rotatable couplings disposed between each of the wheels and the frame, the rotatable couplings configured to freely rotate the wheels in response to the manual pushing of the handle;
   a conduit coupled to the frame and extending transversely across a direction of travel of the apparatus, the conduit being at least 70 inches long, the conduit comprising a plurality of nozzles configured to pressure wash a surface on which the apparatus travels, wherein the conduit length and plurality of nozzles are configured to pressure wash a floor of the trailer in a single pass;
   a fluid pump disposed remotely from the frame and coupled to the conduit via a hose configured to provide a pressurized fluid to the conduit, wherein the trailer wash apparatus is configured to dispense the pressurized fluid with a pressure of at least 500 pounds per square inch with at least 3 gallons per minute; and a remote start device coupled to the frame configured to transmit start and stop signals to the fluid pump, wherein the fluid pump is configured to start or stop providing the pressurized fluid in response to the start or stop signals, respectively, wherein the frame, at least one front wheel, at least one rear wheel, rotatable couplings, conduit and remote start device together weigh less than about 50 pounds.

2. The apparatus of claim 1, wherein the handle is disposed between 36 inches and 56 inches from a bottom of the front or rear wheel.

3. The apparatus of claim 1, wherein the conduit comprises at least eight nozzles configured to pressure wash the surface.

4. The apparatus of claim 1, wherein each of the nozzles is configured to provide a fan spray pattern, wherein adjacent nozzles are configured to fan spray on different planes.

5. The apparatus of claim 1, wherein adjacent nozzles are configured to fan spray on substantially parallel planes.

6. The apparatus of claim 1, wherein the apparatus is configured to pressure wash with a pressure of at least 1000 pounds per square inch with at least 8 gallons per minute.

7. The apparatus of claim 1, further comprising:
a hand sprayer configured to be held in a hand of the human operator; and
a valve having a first port configured to receive a pressurized fluid, a second port configured to provide the pressurized fluid to the conduit, and a third port configured to provide the pressurized fluid to the hand sprayer, the
fluid pump coupled to the first port via a hose configured to provide the pressurized fluid to the first port.

8. The apparatus of claim 7, wherein the remote start device is coupleable to the frame and removable from the frame.

9. The apparatus of claim 7, wherein the valve comprises a fourth port configured to receive a detergent or sanitizer from a source, the valve comprising a handle configured to select between providing the pressurized fluid and the detergent or sanitizer to the conduit.

10. The apparatus of claim 7, further comprising at least two couplers disposed on the frame configured to hold the hand sprayer.

11. The apparatus of claim 1, wherein the front and rear wheels have diameters greater than a distance between the conduit and the surface to be washed.

12. The apparatus of claim 11, wherein the diameters are at least 8 inches.

13. The apparatus of claim 1, wherein the apparatus comprises at least two front wheels and at least two rear wheels, the frame forming an A-shape when viewed from a side with one set of descending members coupled adjacent the rear wheels and a second set of descending members coupled adjacent the front wheels.

14. The apparatus of claim 13, further comprising a cross member disposed between two descending members in the second set of descending members, wherein a valve is coupled to the cross member, the valve comprising a handle configured to select between pressure washing via the conduit and pressure washing via a hand sprayer.

15. A manually-operated trailer wash apparatus specially adapted for manually washing an interior of a trailer, comprising:

a frame comprising a handle configured to be manually pushed by a human operator;
at least one front wheel configured to rotate in a fixed plane;
at least one rear wheel configured to rotate in a fixed plane;
rotatable couplings disposed between each of the wheels and the frame, the rotatable couplings configured to rotate the wheels in response to the manual pushing of the handle;
a conduit coupled to the frame, the conduit being at least 70 inches long and extending transversely across a direction of travel of the apparatus, the conduit comprising a plurality of nozzles configured to pressure wash a floor of the trailer in a single pass,
wherein each of the nozzles is configured to provide a fan spray pattern in a fixed plane, wherein adjacent nozzles are configured to fan spray on fixed, substantially parallel planes,
a fluid pump disposed remotely from the frame and coupled to the conduit via a hose configured to provide a pressurized fluid to the conduit, wherein the trailer wash apparatus is configured to dispense the pressurized fluid with a pressure of at least 500 pounds per square inch with at least 3 gallons per minute; and
a remote start device coupled to the frame configured to transmit start and stop signals to the fluid pump, wherein the fluid pump is configured to start or stop providing the pressurized fluid in response to the start or stop signals, respectively, wherein the frame, at least one front wheel, at least one rear wheel, rotatable couplings, conduit and remote start device together weigh less than about 50 pounds.

16. The apparatus of claim 15, wherein the frame comprises a lift portion extendable from or pivotable around the handle to act as an aid to lift the apparatus into the trailer.

17. The apparatus of claim 16, wherein the lift portion comprises a ladder portion comprising a plurality of steps.

18. The apparatus of claim 15, wherein the conduit comprises at least one coupling joining a center portion of the conduit to an end portion of the conduit, the coupling configured to join the center portion to the end portion of the conduit in a way that is at least partially foldable.

19. The apparatus of claim 15, the frame forming an A-shape when viewed from a side, wherein the frame comprises at least one descending member coupled adjacent the rear wheel and at least one second descending member coupled adjacent the front wheel.

20. The apparatus of claim 15, the frame forming a triangle shape, a Z shape or a U-shape when viewed from a side.

21. A manually-operated trailer wash apparatus specially adapted for manually washing an interior of a trailer, comprising:
a frame comprising a handle on an upper end of the frame configured to be pushed by a human operator;
at least one front wheel;
at least one rear wheel;
rotatable couplings disposed between each of the wheels and the frame to couple the wheels to a lower end of the frame;
a conduit coupled to the frame and extending transversely across a direction of travel of the apparatus, the conduit comprising a plurality of nozzles configured to pressure wash a surface on which the apparatus travels, wherein the frame comprises a frame portion extendable from or pivotable around the handle to a position above the handle, wherein the frame and frame portion comprise a ladder portion comprising at least two side arms and a plurality of cross members extending between the at least two side arms, the cross members configured as a plurality of steps.

\* \* \* \* \*